(12) United States Patent
Freda et al.

(10) Patent No.: US 11,722,960 B2
(45) Date of Patent: Aug. 8, 2023

(54) METHODS AND APPARATUS FOR EFFICIENT POWER SAVING IN WIRELESS NETWORKS

(71) Applicant: IDAC Holdings, Inc., Wilmington, DE (US)

(72) Inventors: Martino M Freda, Laval (CA); Ghyslain Pelletier, Montreal (CA); Tao Deng, Roslyn, NY (US); Paul Marinier, Brossard (CA); Yugeswar Deenoo, Chalfont, PA (US); Aata El Hamss, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/322,862

(22) PCT Filed: Aug. 2, 2017

(86) PCT No.: PCT/US2017/045033
§ 371 (c)(1),
(2) Date: Feb. 1, 2019

(87) PCT Pub. No.: WO2018/031327
PCT Pub. Date: Feb. 15, 2018

(65) Prior Publication Data
US 2021/0014791 A1    Jan. 14, 2021

Related U.S. Application Data

(60) Provisional application No. 62/474,665, filed on Mar. 22, 2017, provisional application No. 62/453,372, (Continued)

(51) Int. Cl.
*H04W 52/02*   (2009.01)

(52) U.S. Cl.
CPC ... *H04W 52/0232* (2013.01); *H04W 52/0251* (2013.01); *H04W 52/0277* (2013.01)

(58) Field of Classification Search
CPC ............. H04W 52/322; H04W 52/325; H04W 52/283; H04W 4/00; H04W 72/04;
(Continued)

(56) References Cited

U.S. PATENT DOCUMENTS 8,094,595 B2 *   1/2012   Montojo ........... H04W 52/0216
                                                    370/335
9,131,489 B2 *   9/2015   Feng ..................... H04W 72/23
(Continued)

FOREIGN PATENT DOCUMENTS

CN    102017733 A      4/2011
CN    102300294 A     12/2011
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.0.0, Sep. 2016, 314 pages.
(Continued)

*Primary Examiner* — Man U Phan
(74) *Attorney, Agent, or Firm* — Jamie T. Nguyen

(57) ABSTRACT

Methods and apparatus for power saving in a wireless network are disclosed. A Wireless Transmit/Receive Unit (WTRU) may comprise a transmitter, a receiver, and a processor. The processor may determine a processing state pertaining to behavior of the WTRU and determine a minimum amount of resources to be processed for one or more sets of physical resources based on the determined processing state. Each respective set of physical resources may
(Continued)

US 11,722,960 B2
Page 2 comprise resources in time, and any of frequency or space. For each respective set of physical resources, the time may comprise a frame structure associated with a numerology applicable to the respective set of physical resources, the frequency may comprise any of a frequency location, a bandwidth, or the numerology, and the space may comprise one or more beams. The processor may process the determined minimum amount of resources of the one of more sets of physical resources.

20 Claims, 14 Drawing Sheets

Related U.S. Application Data filed on Feb. 1, 2017, provisional application No. 62/441,804, filed on Jan. 3, 2017, provisional application No. 62/416,404, filed on Nov. 2, 2016, provisional application No. 62/373,130, filed on Aug. 10, 2016.

(58) Field of Classification Search
CPC ..... H04W 88/06; H04W 80/08; H04W 76/27; H04W 72/14; H04W 76/11; H04W 72/042; H04W 48/16; H04W 72/0446; H04L 5/00; H04L 5/10; H04L 1/0036; H04L 1/0079; H04L 5/0048; H04L 1/0013; H04L 5/0053; H04L 27/2602
USPC .......................................................... 370/311
See application file for complete search history.

(56) References Cited

U.S. PATENT DOCUMENTS

| | | | |
|---|---|---|---|
| 9,325,472 B2* | 4/2016 | Kim | H04L 5/0035 |
| 9,807,755 B2* | 10/2017 | Kim | H04L 27/2602 |
| 9,872,289 B2* | 1/2018 | Chen | H04W 72/0446 |
| 10,075,946 B2 | 9/2018 | Ko et al. | |
| 10,104,651 B2* | 10/2018 | Chen | H04W 72/23 |
| 10,165,606 B2 | 12/2018 | Sammour et al. | |
| 10,595,283 B2* | 3/2020 | Kim | H04W 52/325 |
| 10,631,178 B2* | 4/2020 | Sun | H04W 24/02 |
| 10,652,872 B2* | 5/2020 | You | H04W 88/06 |
| 10,925,079 B2* | 2/2021 | Park | H04W 72/0446 |
| 11,057,891 B2* | 7/2021 | Cheng | H04W 8/24 |
| 11,395,319 B2* | 7/2022 | Muruganathan | H04W 72/23 |
| 2009/0296616 A1 | 12/2009 | Lim et al. | |
| 2010/0279628 A1 | 11/2010 | Love et al. | |
| 2011/0305215 A1 | 12/2011 | Hofmann et al. | |
| 2013/0242882 A1 | 9/2013 | Blankenship et al. | |
| 2014/0003349 A1 | 1/2014 | Kang et al. | |
| 2014/0013136 A1 | 1/2014 | Dadu et al. | |
| 2014/0146720 A1 | 5/2014 | Tang et al. | |
| 2014/0169316 A1* | 6/2014 | Kim | H04L 5/0053 370/329 |
| 2014/0198696 A1 | 7/2014 | Li et al. | |
| 2014/0254452 A1 | 9/2014 | Golitschek et al. | |
| 2014/0348141 A1 | 11/2014 | Zhou et al. | |
| 2015/0009832 A1 | 1/2015 | Dalsgaard et al. | |
| 2016/0192433 A1 | 6/2016 | Deenoo et al. | |
| 2016/0219587 A1* | 7/2016 | Lin | H04W 24/08 |
| 2016/0330689 A1 | 11/2016 | Park et al. | |
| 2017/0303251 A1 | 10/2017 | Ko et al. | |
| 2018/0124752 A1* | 5/2018 | Takeda | H04W 72/04 |
| 2018/0145800 A1* | 5/2018 | Srivastav | H04L 1/1887 |
| 2018/0183551 A1* | 6/2018 | Chou | H04W 72/044 |
| 2018/0332605 A1* | 11/2018 | Pelletier | H04W 72/569 |
| 2020/0205134 A1* | 6/2020 | Pan | H04W 72/12 |
| 2020/0213069 A1* | 7/2020 | Jiang | H04L 5/001 |
| 2020/0245302 A1* | 7/2020 | Pan | H04W 28/02 |
| 2020/0260526 A1* | 8/2020 | Xiong | H04W 80/08 |
| 2020/0351682 A1* | 11/2020 | Cirik | H04W 24/08 |
| 2021/0084628 A1* | 3/2021 | Kim | H04W 76/27 |
| 2021/0143936 A1* | 5/2021 | Zhang | H04L 5/0092 |
| 2021/0235441 A1* | 7/2021 | Wang | H04L 5/0048 |
| 2021/0243741 A1* | 8/2021 | Lin | H04W 76/28 |
| 2021/0391948 A1* | 12/2021 | Taherzadeh Boroujeni | H04L 1/0072 |
| 2022/0014299 A1* | 1/2022 | Ji | H04L 5/0016 |
| 2022/0132342 A1* | 4/2022 | Kim | H04W 74/0816 |
| 2022/0191865 A1* | 6/2022 | Marinier | H04W 72/0453 |
| 2022/0294591 A1* | 9/2022 | Liu | H04L 5/0091 |
| 2022/0295401 A1* | 9/2022 | Lin | H04W 52/0216 |
| 2022/0311588 A1* | 9/2022 | Golitschek Edler von Elbwart | H04L 5/0091 |
| 2022/0345920 A1* | 10/2022 | Liu | H04W 24/08 |

FOREIGN PATENT DOCUMENTS

| | | |
|---|---|---|
| CN | 104756557 A | 7/2015 |
| CN | 105191432 A | 12/2015 |
| EP | 2696631 A1 | 2/2014 |
| JP | 2010508704 A | 3/2010 |
| JP | 2014112930 A | 6/2014 |
| JP | 2015502089 A | 1/2015 |
| KR | 20110134305 A | 12/2011 |
| RU | 2558733 C2 | 8/2015 |
| TW | I539848 B | 6/2016 |
| WO | WO 2012137294 A1 | 10/2012 |
| WO | WO 2014172306 A2 | 1/2015 |
| WO | WO 2015105390 A1 | 7/2015 |
| WO | WO 2015116732 A1 | 8/2015 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.0.0, Sep. 2016, 96 pages.
"3rd Generation Partnership Project; Technical Specification Group Radio Access Network; Evolved Universal Terrestrial Radio Access (E-UTRA); Multiplexing and channel coding (Release 10)", 3GPP TS 36.212 V10.1.0, Mar. 2011, 76 pages.
"3rd Generation Partnership Project; Technical Specification Group Radio Access Network; Evolved Universal Terrestrial Radio Access (E-UTRA); Physical Channels and Modulation (Release 10)", 3GPP TS 36.211 V10.1.0, Mar. 2011, 103 pages.
"3rd Generation Partnership Project; Technical Specification Group Radio Access Network; Evolved Universal Terrestrial Radio Access (E-UTRA); Physical layer procedures (Release 10)", 3GPP TS 36.213 V10.1.0, Mar. 2011, 115 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 644 pages.
Interdigital Communications, "Numerology and frame structure for New Radio", 3GPP Tdoc R1-162579; 3GPP TSG-RAN WG1 Meeting #84bis; Busan, Korea, Apr. 11-15, 2016, 3 pages.
Interdigital Communications, "Radio Bearers and Per-Flow QoS for New Radio Access", 3GPP Tdoc R2-164089;3GPP TSG-RAN WG2 #94, Nanjing, China, May 23-27, 2016, 5 pages.
Nokia, et al., "Scheduling Framework and Requirements", 3GPP Tdoc R2-163445; 3GPP TSG-RAN WG2 Meeting #94; Nanjing, China, May 23-27, 2016, 4 pages.
Samsung, "Discussions on control signaling for NR", 3GPP Tdoc R1-163994, 3GPP TSG RAN WG1 #85, Nanjing, China, May 23-27, 2016, 3 pages.
3GPP TSG-RAN WG1Meeting #67 R1-113655,Considerations on the ePDCCH design Nov. 8, 2011 3GPPConsiderations on the ePDCCH design.

* cited by examiner

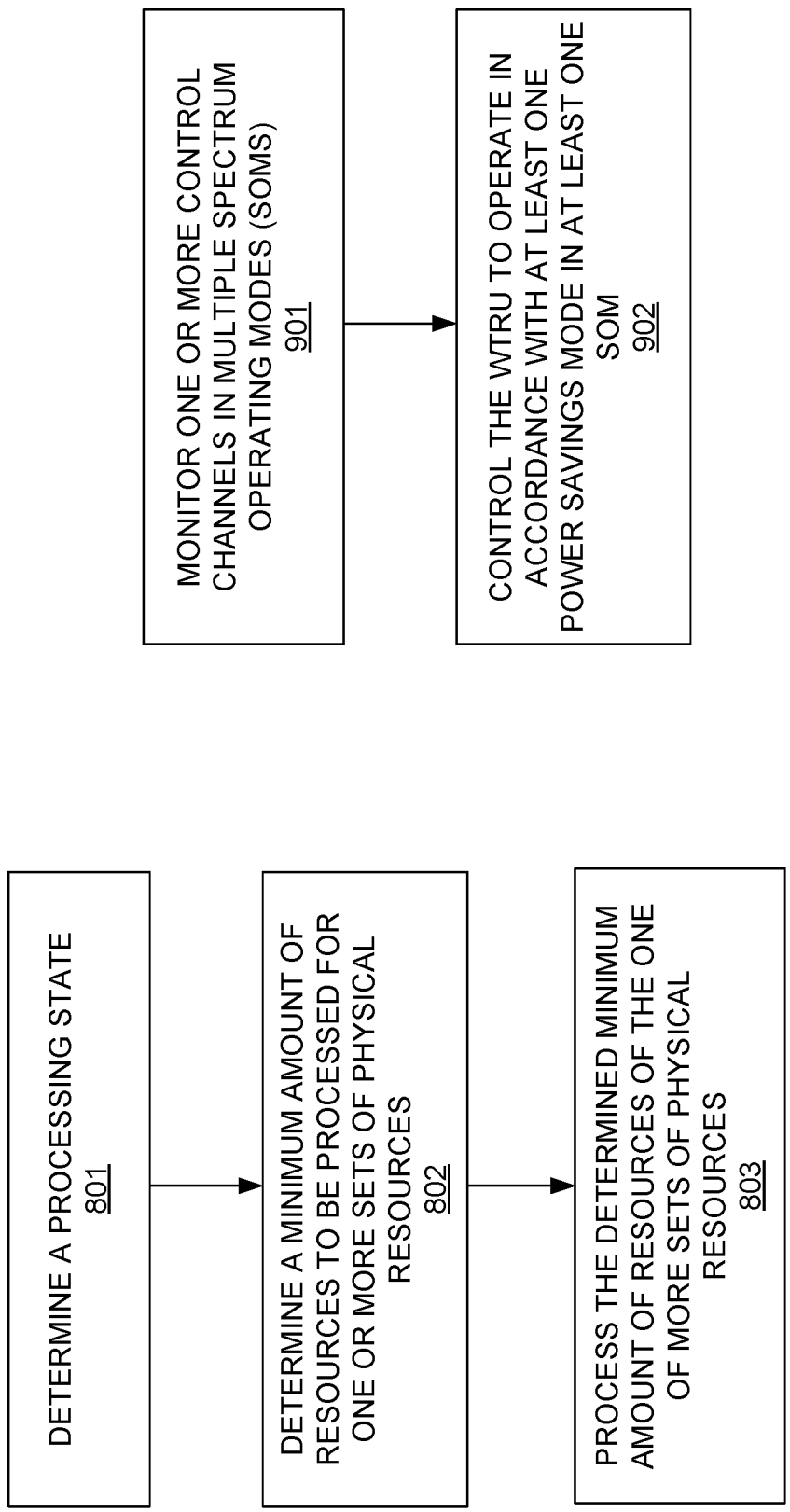

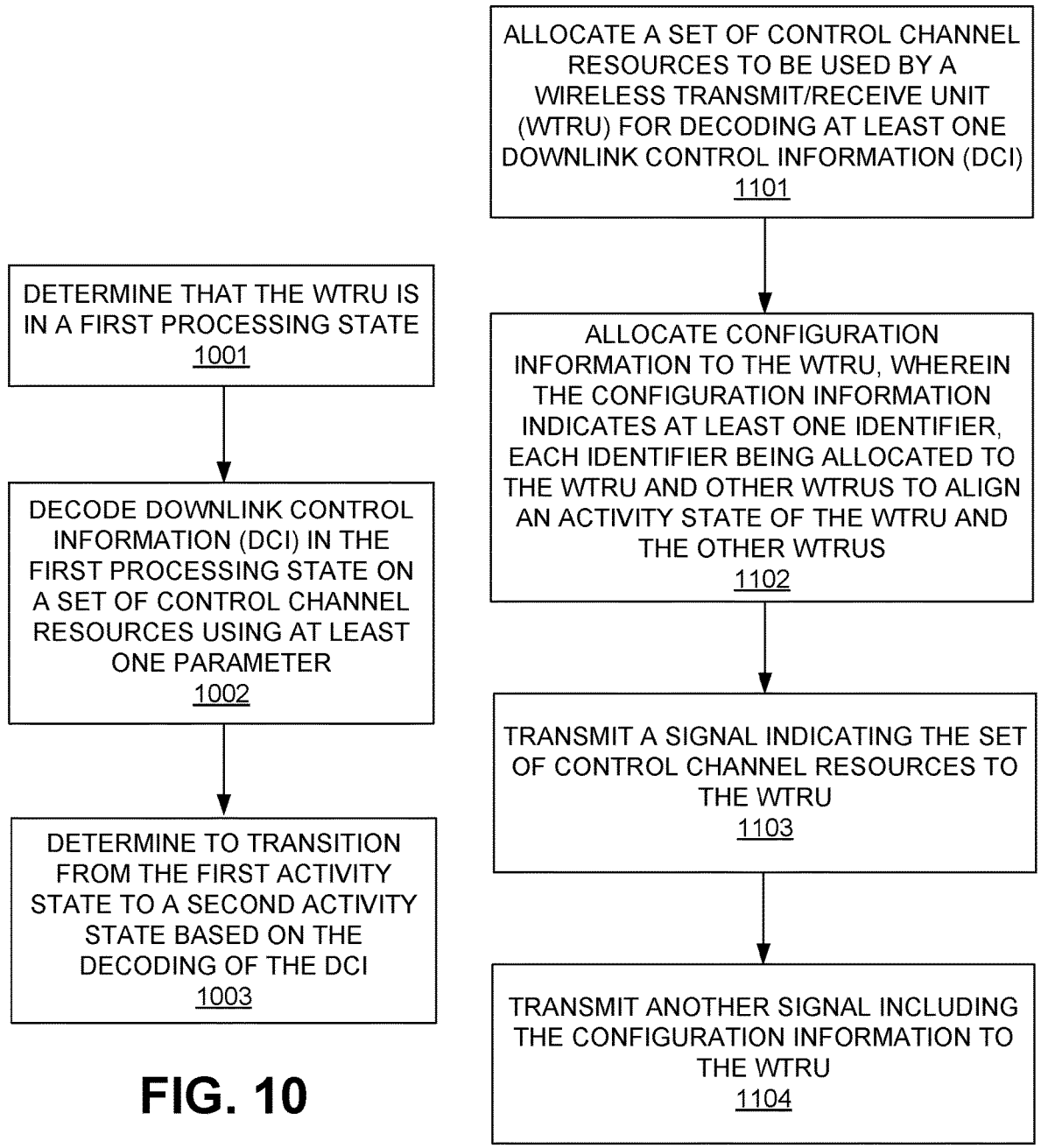

METHODS AND APPARATUS FOR EFFICIENT POWER SAVING IN WIRELESS NETWORKS

CROSS REFERENCE TO RELATED APPLICATIONS

This application is a 371 U.S. National Stage entry of PCT Application No. PCT/US2017/045033, filed Aug. 2, 2017, which claims priority from U.S. Provisional Patent Application No. 62/373,130 filed on Aug. 10, 2016, U.S. Provisional Patent Application No. 62/416,404 filed on Nov. 2, 2016, U.S. Provisional Patent Application No. 62/441,804 filed on Jan. 3, 2017, U.S. Provisional Patent Application No. 62/453,372 filed on Feb. 1, 2017, and U.S. Provisional Patent Application No. 62/474,665 filed on Mar. 22, 2017, the contents of each of which is hereby incorporated herein by reference as if fully set forth.

FIELD

This application is related to power saving features in wireless communications.

RELATED ART

Mobile communications are in continuous evolution and are already at the doorstep of its fifth incarnation, which is called, 5th Generation ("5G"). As with previous generations, new use cases have been proposed in connection with the setting of requirements for the new system.

SUMMARY

Methods, apparatuses, and systems for a Wireless Transmit/Receive Unit (WTRU) device executing power saving features are provided. In one embodiment, a WTRU device may be configured to determine a processing state that pertains to behavior of the WTRU and determine a minimum amount of resources to be processed for one or more sets of physical resources based on the determined processing state. Each respective set of physical resources may comprise resources in time, and any of frequency or space. For each respective set of physical resources, the time may comprise to a frame structure associated with a numerology applicable to the respective set of physical resources. The frequency may comprise any of: a frequency location (e.g., a center frequency), a bandwidth (e.g., a number of physical resource blocks), or the numerology. The space may comprise one or more beams. The WTRU may be further configured to process the determined minimum amount of resources of the one of more sets of physical resources.

In another embodiment, a WTRU device may be configured to monitor one or more control channels in multiple spectrum operating modes (SOMs). The WTRU may be configured to operate in accordance with at least one power savings mode in at least one SOM. A SOM (e.g., each SOM) may be associated with a control channel that carries information for allocating a set of spectrum blocks for the WTRU.

In another embodiment, a method performed by a WTRU may be configured to determine a set of resources as a function of a processing state of the WTRU. The WTRU may be further configured to monitor one or more control channels using the determined set of resources. The WTRU may be further configured to decode at least one control channel element on the control channel.

Methods, apparatuses, and systems for a network entity executing power saving features are provided. In one embodiment, the network entity may comprise a transmitter, a receiver, and a processor, coupled to the transmitter and the receiver. The network entity may be configured to allocate a set of control channel resources to be used by a WTRU for decoding at least one downlink control information (DCI). Resources for a control channel may be organized as a COntrol REsource SET (CORESET). The network entity may allocate configuration information to the WTRU. The configuration information may indicate at least one identifier, each identifier being allocated to the WTRU and other WTRUs, for example to align a processing state of the WTRU and the other WTRUs. The network entity may be configured to transmit a signal indicating the set of control channel resources to the WTRU and transmit another signal including the configuration information to the WTRU.

Control of Applicable Resources in Time/Frequency/Space for One or More Control Channels In some embodiments, a UE may be configured to monitor (e.g., minimally or at least monitor) and decode control channel(s) using a varying set (e.g., in different combinations from minimal set up to maximal set) of: CORESETs, resources (e.g., control channel elements (CCEs), search spaces, aggregation levels) in time (e.g., mini-slots, slots, or subframes), resources in frequency (e.g., applicable bandwidth, frequency location, etc.), resources in space (e.g., control beams) and/or types of signalling structures (e.g., DCI sizes, DCI formats).

Control of Decoding Requirements with Variable Intensity as a Function of Control Signaling and More In another embodiment, a UE may vary the intensity of its control channel reception process as a function of received control signaling, of the reported radio link quality (e.g., detection of blocking for a beam), of the type of configured services (e.g., eMBB, URLLC), of configuration of bearers (e.g., data radio bearers (DRBs) and/or signal radio bearers (SRBs), and configured QoS parameters), of beam characteristics, of characteristics of beam management (e.g., a number of configured beams above or below a threshold and/or beam failure events), of the activity observed for a given service (e.g., inter-transmission time, buffer fill/emptying, applicable data rates) or any combination thereof.

The term of "intensity" may be referred to frequencies of reception of a plurality of signaling (e.g., control channels, DCIs, CCEs, etc.), an amount of information sets in the received signals, scheduling intensity (e.g., moving between one control channel monitoring state to another as a result of a number of grants received in a given state, measurement over a time window or at a specific time, and/or based on some rules for transitions which are related to the number of grants), or in any combinations.

For example, TCP-like rate control may be used to control such monitoring activity for an eMBB-like service whereby successful decoding of downlink control information (e.g. on PDCCH) for a transmission may be considered as an acknowledgement (ACK) and a time since a last such decoding exceeding a certain amount may be considered as a negative acknowledgement (NACK) from the perspective of the rate control function. Other examples are provided herein, for example in the Control Channel Decoding Complexity section.

Control of Data Channel Reception as a Function of Varying Decoding Requirements In other embodiments, a UE may be configured to minimally receive data channel(s) using a varying set of resources (e.g., PRBs, spectrum blocks) in time (e.g., mini-slots, slots, subframes), frequency (e.g., applicable bandwidth, frequency location), space (e.g., data channel beams) and/or type of transmissions (e.g., applicable transmission modes) with variable intensity. Further examples are described herein, for example in the Data Bandwidth Configuration section.

Control of Data Channel Reception as a Function of Varying Control Channel Activity A UE may vary the intensity of the data channel reception (e.g., the amount of bandwidth processed by the RF) as a function of the intensity of an associated control channel Adaptation of Such Control for Applicability to Mixed Numerologies/Transmission Duration In other embodiments, a UE may be configured to apply and control a power savings mode (e.g. legacy Discontinuous Reception (DRX) or combinations of methods described herein) using different timing relationships (e.g. different clocks and/or counting when managing timers). For instance, the various timing relationships may be a function of frame duration associated with a given numerology and/or a function of associated scheduling opportunities/occasions.

BRIEF DESCRIPTION OF THE DRAWINGS

A more detailed understanding may be had from the following description, given by way of example in conjunction with the accompanying drawings wherein:

FIG. 8 is a flow diagram illustrating a representative method for power saving;

FIG. 9 is a flow diagram illustrating another representative method for power saving;

FIG. 10 is a flow diagram illustrating another representative method for power saving; and FIG. 11 is a flow diagram illustrating another representative method for power saving.

DETAILED DESCRIPTION

Figure 1A:
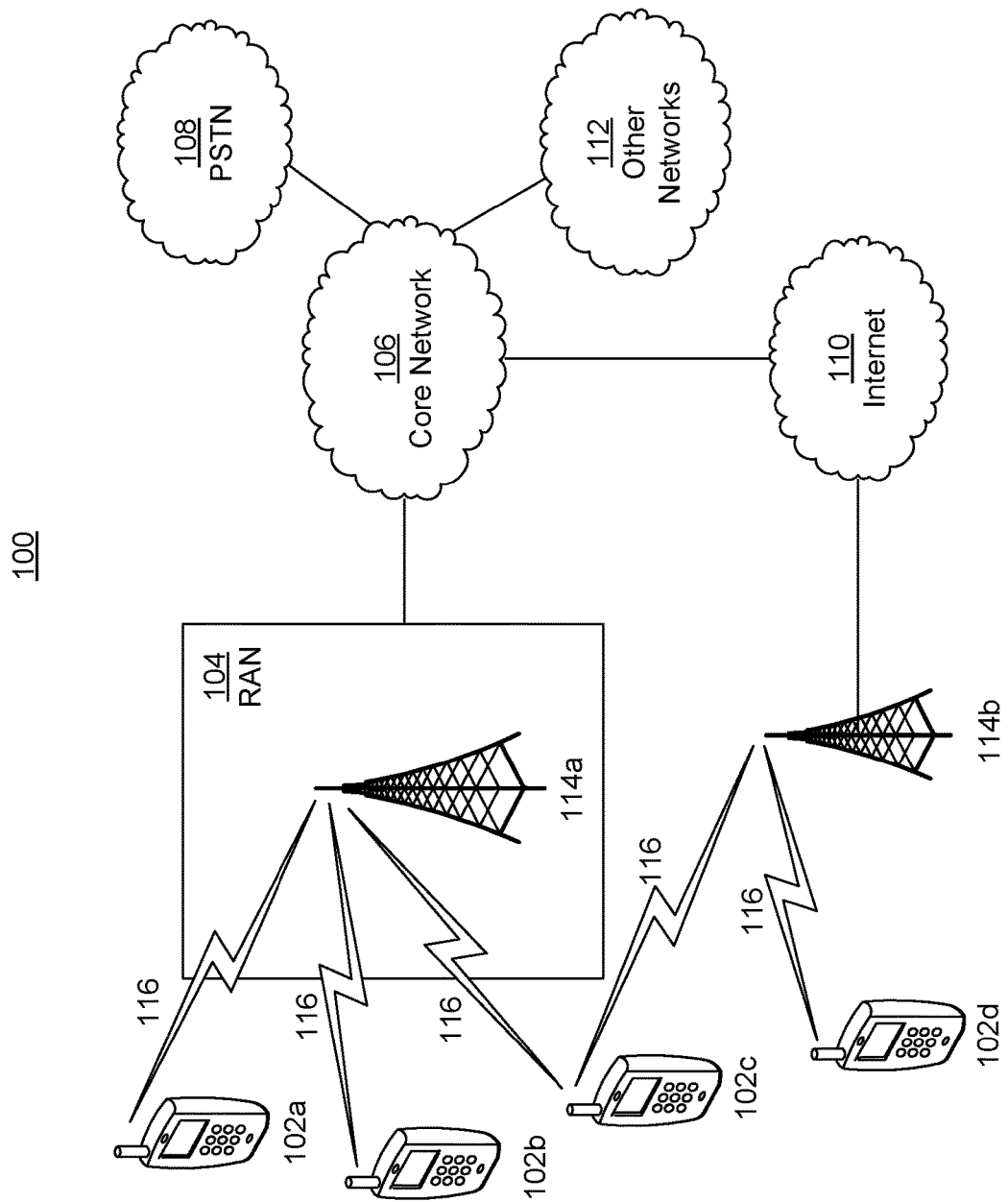
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an evolved Node B (eNode-B), a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA 2000, CDMA 2000 1×, CDMA 2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA 2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
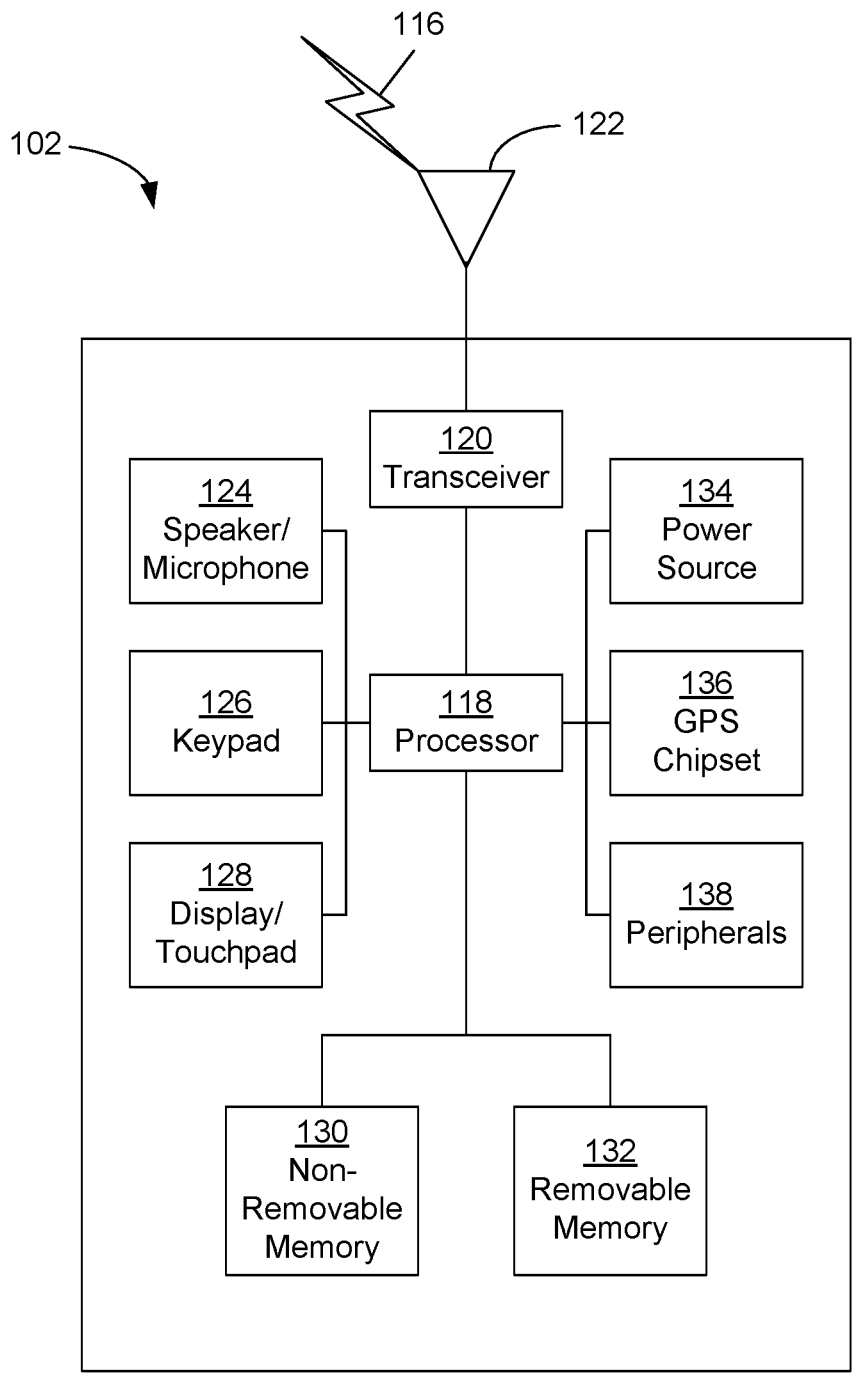
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of IC, a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/ receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
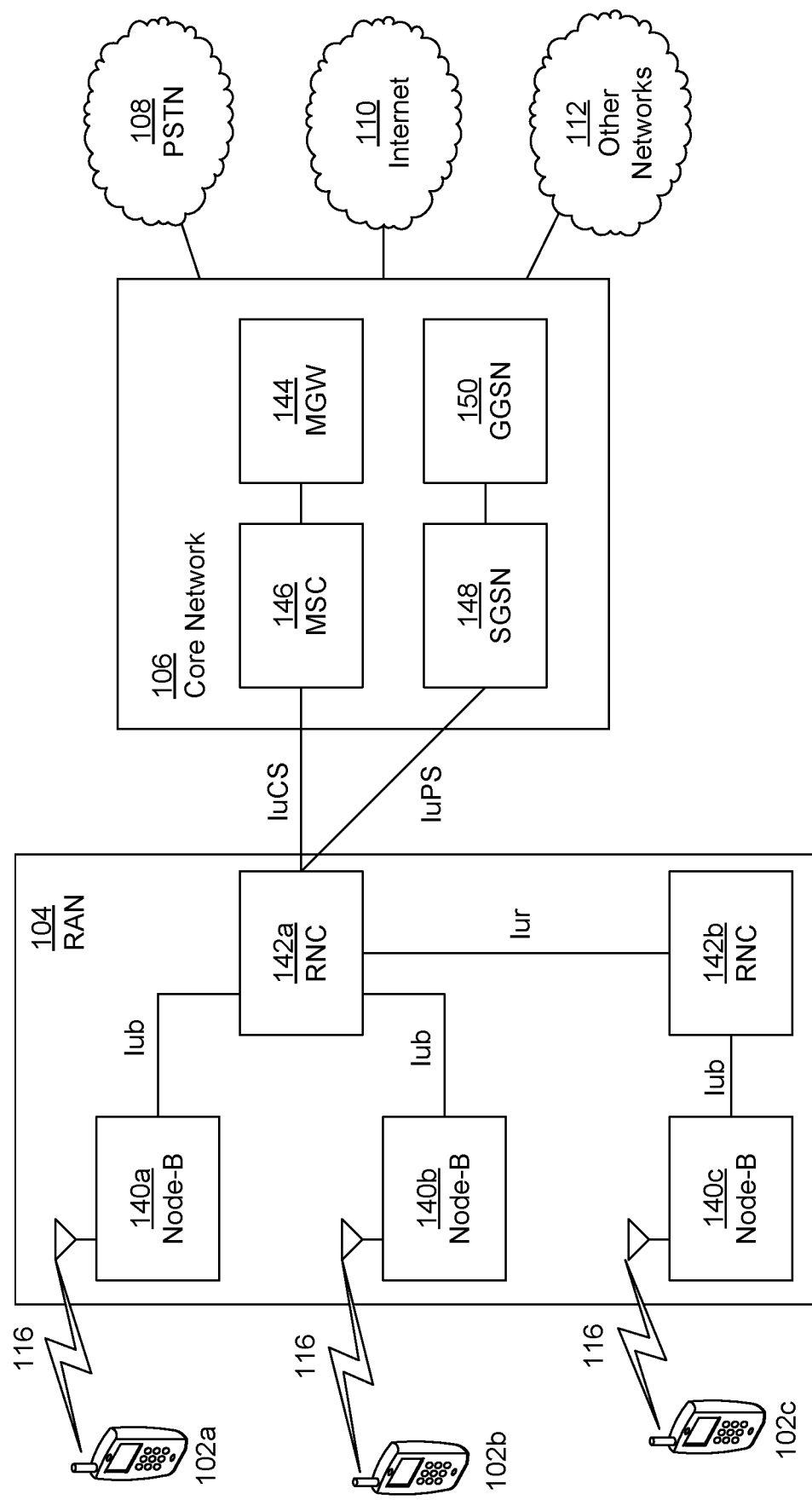
FIGS. 1C, 1D, and 1E are system diagrams of example radio access networks and example core networks that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
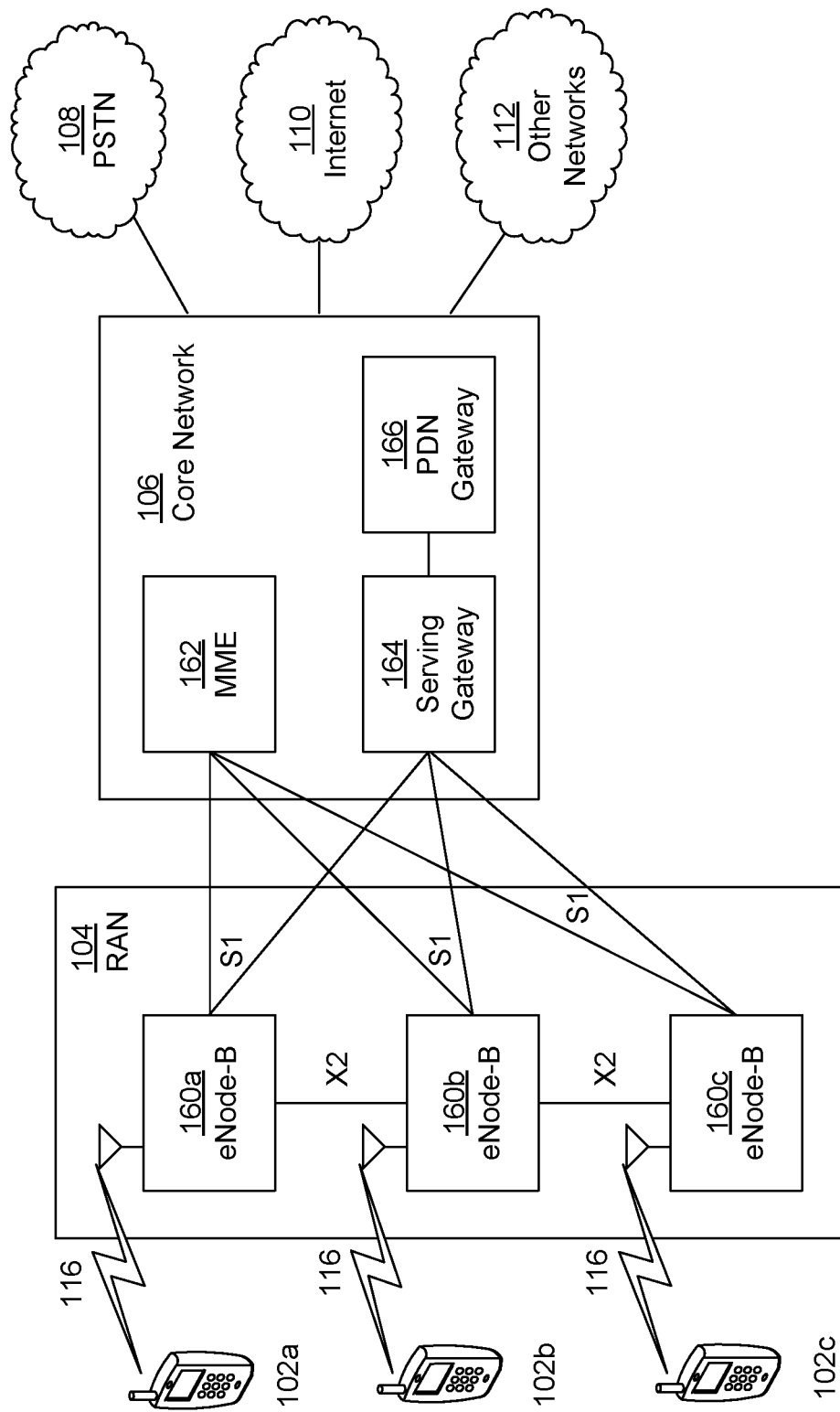

FIG. 1D is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
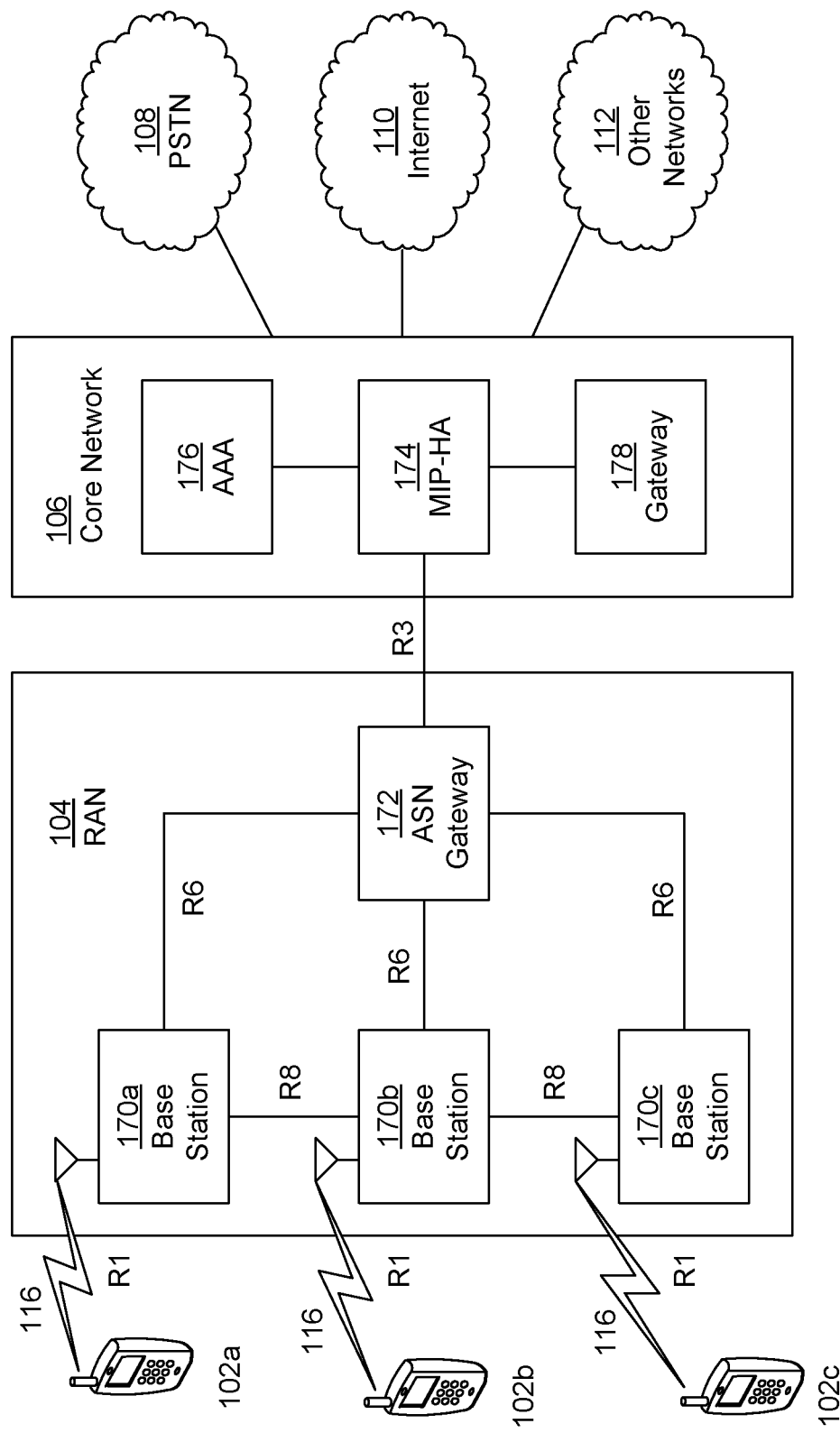

FIG. 1E is a system diagram of the RAN 104 and the core network 106 according to another embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 102c.

As shown in FIG. 1E, the RAN 104 may be connected to the core network 106. The communication link between the RAN 104 and the core network 106 may be defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

The following paragraphs provide a general description of possible approaches for design of a 5G system that may correspond at least in part to a New Radio access technology ("NR"), without limiting the applicability of various embodiments described further herein to such methods, apparatus and/or systems.

It may be expected that the 5G air interface will enable at least the following use cases: improved broadband performance ('IBB"), industrial control and communications ("ICC") and vehicular applications ("V2X"), and Massive Machine-Type Communications ("mMTC").

The use cases above may have support for ultra-low transmission latency (Low Latency Communications, "LLC"). Air interface latency as low as 1 ms round-trip time ("RTT") may have support for transmission time intervals ("TTIs") somewhere between 100 μs and (no larger than) 250 μs. Support for ultra-low access latency (e.g., time from initial system access until the completion of the transmission of the first user plane data unit) may be implemented. At least ICC and V2X may support end-to-end (e2e) latency of less than 10 ms.

The use cases may have support for ultra-reliable communications ("URC"). In certain representative embodiments, transmission reliability that may be better than (e.g., much better than, for example excessing a threshold level) what is possible with conventional LTE systems may be implemented. For example, a possible target may be close to or about 99.999% transmission success and service availability.

Another consideration may be support for mobility for speed in the range of 0-500 km/h.

Furthermore, at least ICC and V2X will have (e.g., likely have) a packet loss ratio ("PLR") of less than $10\,e^{-6}$.

The use cases may have support for Machine-Type Communications ("MTC") operation (including narrowband operation). The air interface may efficiently support narrowband operation (e.g., using less than 200 KHz), extended battery life (e.g., up to 15 years of autonomy) and minimal communication overhead for small and infrequent data transmissions, e.g., a low data rate in the range of 1-100 kbps with access latency of seconds to hours.

Principles for Nest Generation of Radio Acess-"5G" or "5gFLEX"

Orthogonal Frequency-Division Multiplexing ("OFDM") may be used as the signal format for data transmissions in Long Term Evolution ("LTE", e.g., from 3GPP LTE R8 and up) and/or IEEE 802.11. OFDM essentially may efficiently divide the spectrum into multiple parallel orthogonal sub-bands (or sub-carriers). Subcarriers (e.g., each subcarrier) may be shaped using a rectangular window in the time domain leading to sinc-shaped subcarriers in the frequency domain. OFDMA uses frequency synchronization (e.g., perfect frequency synchronization) and tight management of uplink ("UL") timing alignment within the duration of the cyclic prefix to maintain orthogonality between signals and to minimize inter-carrier interference. Such tight synchronization may not be well-suited to a system where a user equipment ("UE") is connected to multiple access points simultaneously. Additional power reduction may be applied (e.g., is typically applied) to uplink transmissions compliant with spectral emission requirements for adjacent bands, for example in the presence of aggregation of fragmented spectrum for UE transmissions.

It is acknowledged that some of the shortcomings of conventional (or cyclic prefix) OFDM ("CP-OFDM") can be addressed by more stringent Radio Front end ("RF") requirements for implementations, and, for example, when operating using a large amount of contiguous spectrum not requiring aggregation. A cyclic prefix ("CP")-based OFDM transmission scheme may lead to a downlink ("DL") physical layer for 5G similar to that of the legacy system, e.g., mainly modifications to pilot signal density and location.

Other waveform candidates may be implemented for the 5G Flexible Radio Access Technology ("5gFLEX"), although CP-OFDM remains a possible candidate for 5G systems (at least for the downlink transmission scheme).

A number of principles, for example applicable to the implementation of a flexible radio access for 5G are described herein.

Such description is for representative purposes and is not intended to limit in any way the applicability of the embodiments described further herein from being applied to other wireless technologies and/or to wireless technology using different principles, when applicable.

Principle A—Spectrum Flexibility

The 5gFLEX radio access may be characterized by a very high degree of spectrum flexibility that enables deployment in different frequency bands with different characteristics, including different duplex arrangements, different and/or variable sizes of the available spectrum including contiguous and non-contiguous spectrum allocations in the same or different bands. 5gFLEX radio access may support variable timing aspects, including multiple TTI lengths and asynchronous transmissions.

Principle A. 1—Flexibility in Duplexing Arrangement

Time-Division Duplexing ("TDD") and/or Frequency Division Duplexing ("FDD") schemes may be implemented. For FDD operations, supplemental downlink operation may be implemented using spectrum aggregation. FDD operation may implement full-duplex FDD and/or half-duplex FDD operation. For TDD operation, the DL/UL allocation may be dynamic, e.g., the DL/UL allocation may not be based on a fixed DL/UL frame configuration, for example, the length of a DL and/or a UL transmission interval may be set per transmission opportunity.

Principle A. 2—Bandwidth Flexibility

One possible characteristic of a 5G air interface implementation may be, for example to enable the possibility of different transmission bandwidths on both uplink and downlink ranging from anything between a nominal system bandwidth to a maximum value corresponding to the system bandwidth.

For single carrier operation, system bandwidths may include, for example, at least 5, 10, 20, 40 and/or 80 MHz. System bandwidths may be any bandwidth in a given range, e.g., from a few MHz up to 160 MHz. Nominal bandwidths may have one or more fixed values. Narrowband transmissions of up to 200 KHz may be supported within the operating bandwidth, for example for MTC devices.

Figure 2:
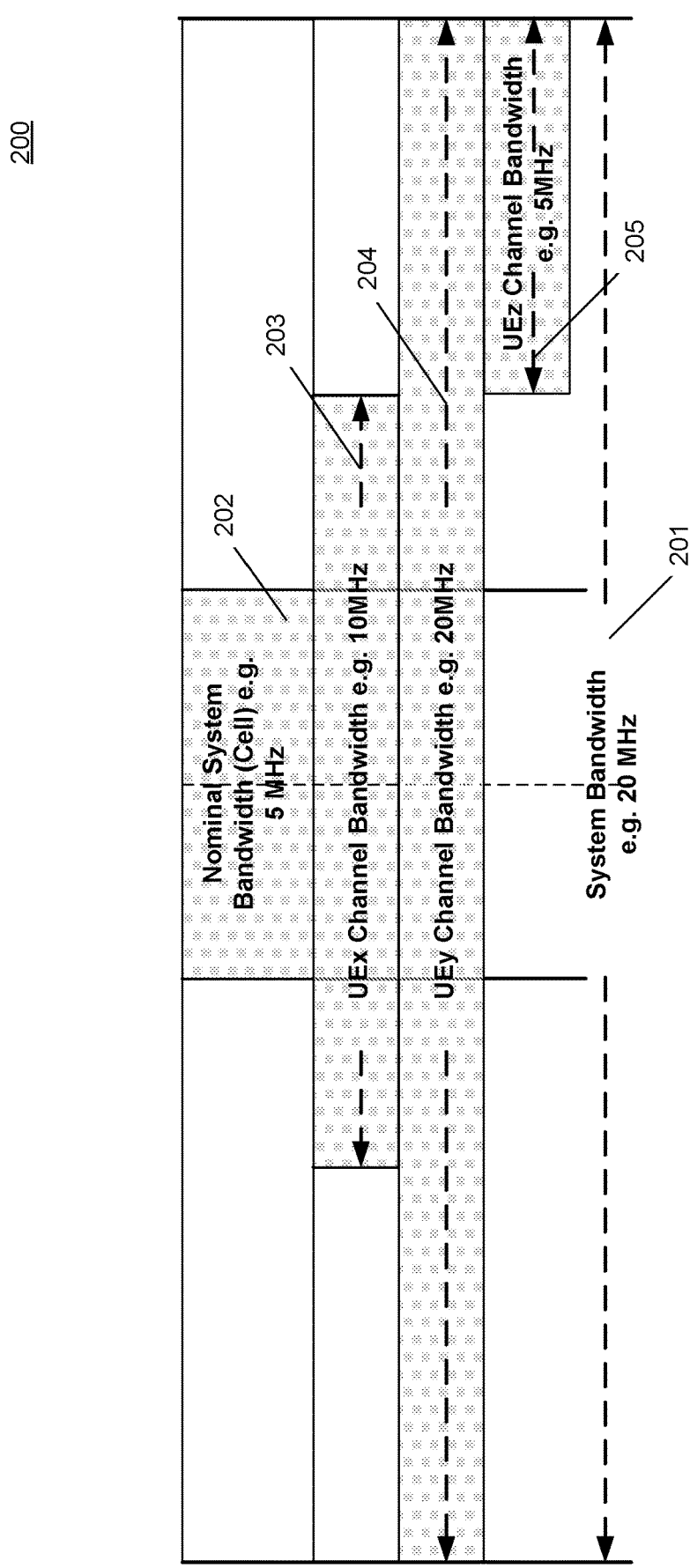
FIG. 2 shows a representative bandwidth allocation including nominal system bandwidth and channel bandwidth allocated per UE.

FIG. 2 shows a representative bandwidth allocation including nominal system bandwidth and channel bandwidth allocated per UE. System bandwidth 201 herein may refer to the largest portion of spectrum that can be managed by a network for a given carrier. For the given carrier, the portion that a UE minimally supports for cell acquisition, measurements and initial access to the network may correspond to the nominal system bandwidth 202. A UE may be configured with a channel bandwidth that may be within a range of the entire system bandwidth. For example, a channel bandwidth 203, e.g., 10 MHz, including nominal system bandwidth 202 may be allocated to UEx and another channel bandwidth 204, e.g., 20 MHz, including nominal system bandwidth 202 may be allocated to UEy. A channel bandwidth may or may not include the nominal part of the system bandwidth. For example, a channel bandwidth 205 allocated to UEz does not include nominal system bandwidth 202, as shown in FIG. 2.

Baseband filtering of the frequency domain waveform can be used to achieve bandwidth flexibility. For example, the baseband filtering may avoid the use of additional allowed channel bandwidths within a UE's operating band and the associated RF requirements for these additional allowed channel bandwidths.

Methods to configure, reconfigure and/or dynamically change a UE's channel bandwidth for single carrier operation and/or methods to allocate spectrum for narrowband transmissions within the nominal system, system and/or configured channel bandwidth may be implemented.

The physical layer of a 5G air interface may be band-agnostic and may support operation in licensed bands below 5 GHz and/or support operation in the unlicensed bands in the range 5-6 GHz. For operation in the unlicensed bands, Listen-Before-Talk ("LBT") Cat 4 based channel access framework similar to LTE License Assisted Access ("LAA") may be implemented.

Methods to scale and manage (e.g., scheduling, addressing of resources, broadcasted signals, measurements) cell-specific and/or UE-specific channel bandwidths for arbitrary spectrum block sizes may be implemented.

Principle A. 3—Flexible Spectrum Allocation

Downlink control channels and signals may support frequency division multiplexing ("FDM") operation. A UE may acquire a downlink carrier by receiving transmissions using the nominal part (e.g., only the nominal part) of the system bandwidth, e.g., the UE may not initially be set and/or required to receive transmissions covering the entire bandwidth that is being managed by the network for the concerned carrier.

Downlink data channels may be allocated over a bandwidth that may or may not correspond to the nominal system bandwidth, e.g., without restrictions other than being within the UE's configured channel bandwidth. For example, the network may operate a carrier with 12 MHz system bandwidth using 5 MHz nominal bandwidth allowing devices supporting at most 5 MHz maximum RF bandwidth to acquire and access the system and, for example allocating +10 to −10 MHz of the carrier frequency to other UE's supporting up to 20 MHz worth of channel bandwidth.

Figure 3:
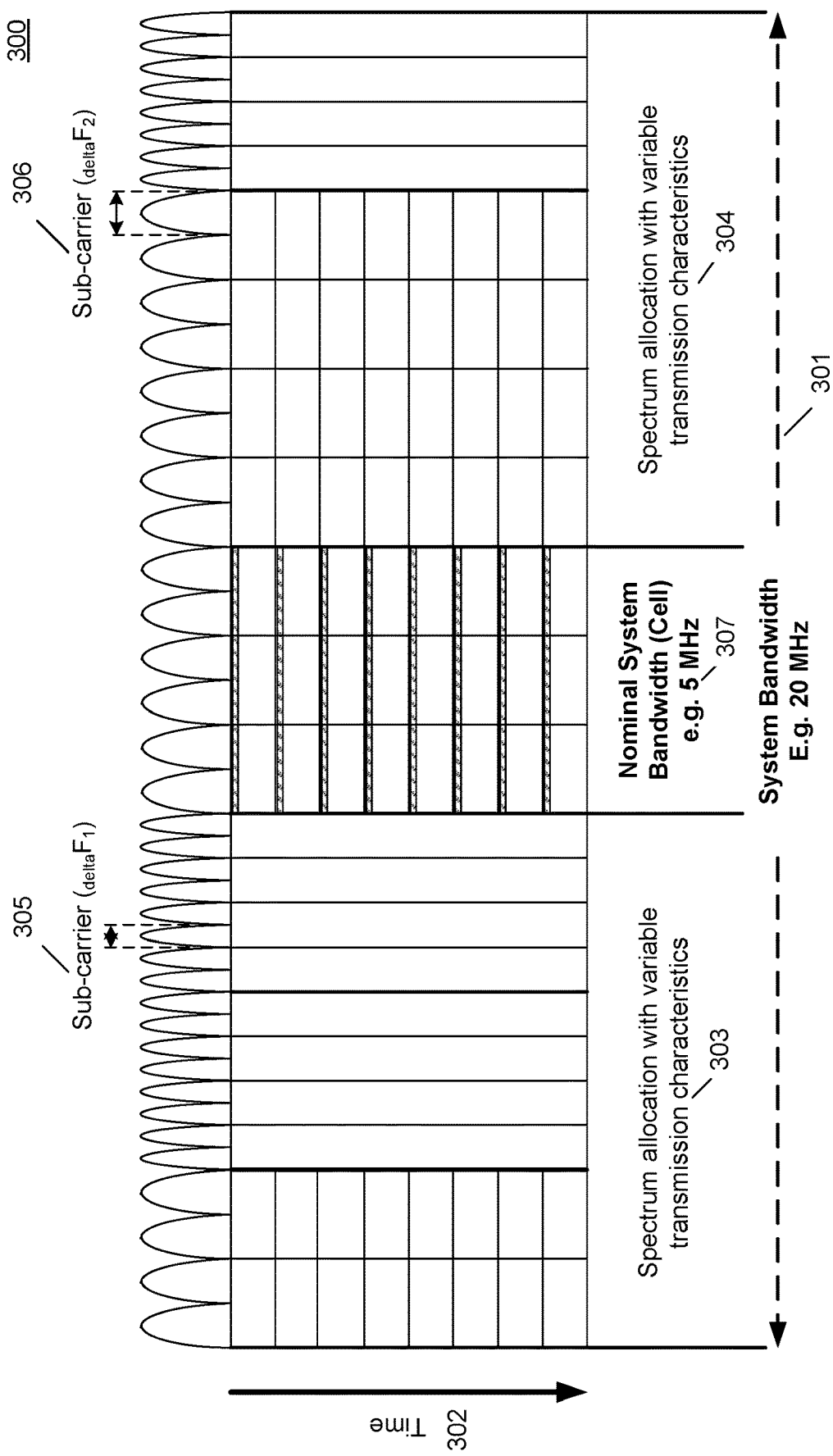
FIG. 3 shows a representative flexible spectrum allocation.

FIG. 3 shows an example of flexible spectrum allocation including a nominal bandwidth 307, for example, allowing devices to acquire and access the system. The flexible spectrum allocation with different sets of subcarriers, e.g., 305 and 306, may be assigned to different modes of operation (hereafter Spectrum Operation Mode, SOM). Different SOMs may be used to fulfill different requirements for different transmissions, for example, spectrum allocation with variable transmission characteristics 303 and 304 as disclosed in FIG. 3. A SOM may be associated with a specific numerology. A numerology may be, for instance, a set of resource allocations with transmission bandwidth configured in uplink and/or downlink of a cell. The numerology may be used as a reference for transmitter and receiver radio frequency requirements. A SOM may consist of and/or include at least one of a subcarrier spacing, a TTI length, and/or one or more reliability aspects, e.g., Hybrid Automatic Repeat reQuest ("HARQ") processing aspects, and/or a secondary control channel A SOM may be used to refer to a specific waveform or may be related to a processing aspect, e.g., in support of co-existence of different waveforms in the same carrier using Frequency-Division Multiplexing ("FDM") and/or Time-Division Multiplexing ("TDM"). Blocks of resources in time and frequency may be associated with a SOM.

Principle A. 4—Spectrum Operating Mode ("SOM")

A UE may be configured to perform transmissions according to one or more SOMs. A SOM may be associated with a specific numerology. For example, a SOM may correspond to transmissions that uses at least one of the following: a specific TTI duration, a specific initial power level, a specific HARQ processing type, a specific upper bound for successful HARQ reception/transmission, a specific transmission mode, a specific physical channel (e.g., uplink or downlink), a specific waveform type and/or a transmission according to a specific RAT (e.g., legacy LTE or according to a 5G transmission method).

A SOM may comprise quality of service ("QoS", from physical layer perspective) level and/or related aspect, e.g., maximum/target latency, maximum/target Block Error Rate ("BLER") or something similar. A SOM may comprise a spectrum area and/or a specific control channel or aspect thereof (including search space, Downlink Control Information ("DCI") type, etc.). For example, a UE may be configured with a SOM for each or any of a URC type of service, a LLC type of service and/or a Massive Broadband Communications ("MBB") type of service. For example, a UE may have a configuration for a SOM for system access and/or for transmission/reception of L 3 control signaling (e.g., Radio Resource Control, "RRC"), e.g., in a portion of a spectrum associated with the system such as in a nominal system bandwidth. Blocks of resources in time and frequency may be associated with a SOM. A SOM (each SOM) may be associated with a control channel, for example different control channels on different blocks of resources.

Principle A. 5—Spectrum Aggregation

For single carrier operation, spectrum aggregation may be implemented whereby a UE may support transmission and reception of multiple transport blocks over contiguous or non-contiguous sets of physical resource blocks (PRBs) within the same operating band. Mapping of a single transport block to separate sets of PRBs may be implemented. Support for simultaneous transmissions associated with different SOM requirements may be implemented.

Multicarrier operation may be implemented, for example using contiguous or non-contiguous spectrum blocks within the same operating band or across two or more operating bands. Aggregation of spectrum blocks using different modes, e.g., FDD and TDD and using different channel access methods, e.g., licensed and/or unlicensed band operation below 6 GHz, may be implemented. Support for methods that configure, reconfigure and/or dynamically change a UE's multicarrier aggregation may be implemented.

Principle A. 6—Scheduling and Rate Control

A scheduling function may be supported in the Medium Access Control ("MAC") layer. Two scheduling modes may be considered: network-based scheduling for tight scheduling in terms of resources, timing and transmission parameters of downlink transmissions and/or uplink transmissions, and UE-based scheduling for more flexibility in terms of timing and transmission parameters. For both modes, scheduling information may be valid for a single or for multiple TTIs.

Principle A. 6.1—Network-Based Scheduling

Network-based scheduling may enable the network to manage (e.g., tightly manage) the available radio resources assigned to different UEs, for example to optimize the sharing of the resources. Dynamic scheduling may be implemented.

Principle A. 6.2—UE-Based Scheduling

UE-based scheduling may enable UEs to opportunistically access uplink resources with minimal latency on a per-need basis for example within a set of shared or dedicated uplink resources assigned (e.g., dynamically or not) by the network. Both synchronized and unsynchronized opportunistic transmissions may be implemented. Both contention-based transmissions and contention-free transmissions may be implemented.

Support for opportunistic transmissions (scheduled or unscheduled) may be implemented, for example to meet the ultra-low latency requirements for 5G and the power saving requirement of the mMTC use case.

Principle A. 7—Logical Channel Prioritization

5gFLEX may support some form of association between data available for transmission and available resources for uplink transmissions. Multiplexing of data with different QoS requirements within the same transport block may be supported for example as long as the multiplexing does not introduce negative impact to the service with the most stringent QoS requirement and/or does not introduce unnecessary waste of system resources.

Principle B—Logical Channels ("LCH")

Principle B. 1—LCH

LCH may, herein, represent a logical association between data packets and/or Protocol Data Units ("PDUs"). The logical association may be based on the data units being associated with the same bearer, and/or being associated with the same SOM and/or slice (e.g., such as a processing path using a set of physical resources) whereby, for example, the association may be characterized by at least one of a chaining of processing functions, an applicable physical data (and/or control) channel (or instance thereof) and/or an instantiation of a protocol stack including a specific portion being centralized (e.g., PDCP only, or anything beyond portions of the physical layer processing, e.g., Radio Front end ("RF")) and another portion being closer to the edge (e.g., MAC/Physical ("PHY") in the Transmission/Reception Point ("TRP"), or RF only) for example separated by a front-hauling interface. The term LCH may herein have a different and/or broader meaning than the similar term for LTE systems.

Principle B. 2—Flow-Based Approach, Tuple

A UE may be configured such that it may determine a relationship between different data units. For example, the relationship may be based on a matching function, e.g., based on the configuration of one or more field values common to data units that are part of the same logical association. The fields may correspond to fields in a protocol header associated with the data unit(s). For example, the matching function may use a tuple of parameters for fields of the Internet Protocol ("IP") headers of the data unit such as IP source/destination address(es), transport protocol source/destination port(s) and/or transport protocol type, for example including the IP version, e.g., IPv4 or IPv6.

For example, data units that are part of the same logical association may share a common radio bearer, processing function, SOM and/or may correspond to the same LCH and/or Logical Channel group ("LCG").

Principle C—LCG

Herein, LCG may consist of and/or include a group of LCH(s) (or equivalent as per the definition above) where the grouping is based on one or more criteria. The criteria may be that the one or more LCHs may have a similar priority level that may be applicable to all LCHs of the same LCG or may be associated with the same SOM (or type thereof), the same slice (or type thereof) whereby for example, the association may be characterized by at least one of a chaining of processing functions, an applicable physical data (and/or control) channel (or instance thereof) or instantiation of a protocol stack including a specific portion being centralized (e.g., PDCP only, and/or anything except RF) and another portion being closer to the edge (e.g., MAC/PHY in the TRP, and/or RF only) for example separated by a front-hauling interface. The term LCG may herein have a different and/or broader meaning than the similar term for LTE systems.

Principle D—Transport Channels ("TrCH")

Principle D. 1—TrCH

Herein, TrCH may consists of and/or include a specific set of processing operations and/or a specific set of functions applied to the data information that may affect one or more transmission characteristics over the radio interface.

Principle D. 2—TrCH in LTE

Legacy LTE defines multiple types of TrCH, including, e.g., the Broadcast Channel (BCH), the Paging Channel (PCH), the Downlink Shared Channel (DL-SCH), the Multicast Channel (MCH), and the Uplink Shared Channel (UL-SCH) in addition to the Random Access Channel (that typically does not carry any user plane data). The main transport channels for carrying user plane data are the DL-SCH and the UL-SCH, for the downlink and for the uplink, respectively.

Principle D. 3—TrCH for 5G Systems

For 5G systems, the augmented set of requirements supported by the air interface may lead to implementation of multiple transport channels, e.g., for user and/or control plane data, for a single UE (e.g., even for a single UE device). The term TrCH may herein have a different and/or broader meaning than the similar term for LTE systems. For instance, a transport channel for Ultra-Reliable and Low Latency Communications ("URLLC") (e.g., URLLCH), for mobile broadband (MBBCH), and/or for machine type communications ("MTCCH") may be defined for downlink transmission (e.g., DL-URLLCH, DL-MBBCH and DL-MTCCH) and for uplink transmissions (e.g., UL-URLLCH, UL-MBBCH and UL-MTCCH).

In one example, multiple TrCH may be mapped to a different set of physical resources (e.g., PhCH) belonging to the same SOM, which may enable, for example simultaneous transmission of traffic with different requirements over the same SOM. For example, a URLLCH may be transmitted along with the MTCCH simultaneously when a UE is configured with a single SOM.

In LTE, there are two mode DRX for power savings, for example a connected mode DRX and an idle mode DRX.

Connected mode DRX may specify a minimum physical downlink control channel (PDCCH) decoding requirement while a UE is configured with a connected mode DRX. The connected mode DRX may define the active time for decoding of DCIs with (Semi-Persistent Scheduling, "SPS"-) Cell-Radio Network Identifier (RNTI), Transmit Power Control-Physical Uplink (Shared/Control) Channel, "TPC-PU(S/C)CH"-RNTI, enhanced Interference Mitigation Traffic Adaptation "eIMTA"-RNTI and sidelink (SL)-RNTI and may be based on fixed periodic "on-durations" which occur once per DRX cycle.

Figure 4:
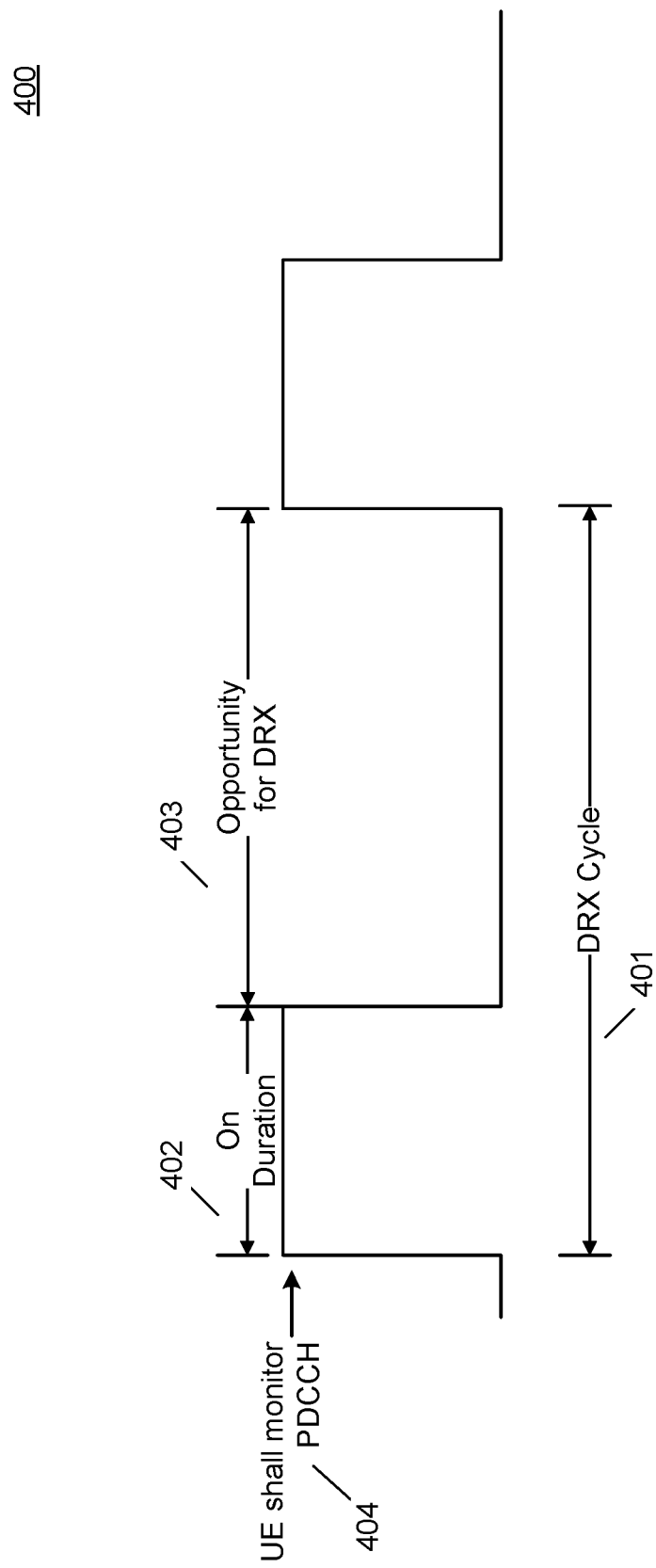
FIG. 4 is a representative diagram of DRX cycles.

FIG. 4 is a representative diagram of DRX cycles. A DRX cycle 401 (e.g., each DRX cycle) may consist of or include an on duration 402 interval and an opportunity for DRX 403 interval. A UE in Connected mode DRX may be configured to monitor PDCCH 404 during the on duration 402 interval.

The DRX operation may be controlled by the following timers: (1) an onDurationTimer indicating the number of consecutive PDCCH-subframe(s) at the beginning of a DRX Cycle; (2) drx-Inactivity Timer indicating the number of consecutive PDCCH-subframe(s) after the subframe in which a PDCCH indicates an initial UL, DL or SL user data transmission for this MAC entity; (3) longDRX-Cycle indicating the number of subframes in the long DRX cycle as configured by upper layers; (4) shortDRX-Cycle indicating the number of subframes in the long DRX cycle as configured by upper layers; (5) drxShortCycleTimer indicating the number of consecutive subframe(s) the MAC entity shall or is to follow the Short DRX cycle.

IDLE mode DRX may allow UEs in IDLE mode to monitor the PDCCH discontinuously for paging on the P-RNTI. Two types of paging opportunities may be defined including: (1) UE specific paging opportunities defined by the MME in Non-Access Stratum (NAS) and/or (2) Cell-specific paging opportunities defined by the eNode-B, for example, in system information block 2 (SIB 2).

A UE can be paged using the P-RNTI while in IDLE mode DRX for DL data arrival, to signal change in system information in the cell, and for Earthquake or Tsunami Warning System (ETWS). Derivation of the paging frame and paging occasion may be based on the UE_ID, as defined in TABLE A and TABLE B below.

TABLE A

| DRX Parameter | Notation | Value Range | Configuring Network node |
| --- | --- | --- | --- |
| UE specific DRX cycle (NAS signaling) | $T_{UE}$ | 32, 64, 128, 256 (in radio frames) | MME |
| Cell specific DRX cycle (Broadcasting) | $T_C$ | 32, 64, 128, 256 (in radio frames) | eNB |
| Number of paging occasions per DRX cycle e.g., DRX cycle across all users in the cell (Broadcasting) | nB | 4T, 2T, T, T/2, T/4, T/8, T/16, T/32 | eNB |

TABLE B

| | | |
| --- | --- | --- |
| DRX cycle (paging cycle) of a UE | T | $=\min(T_{UE}, T_C)$ in radio frames |
| Number of paging frames within UE's DRX cycle | N | min(T, nB) |

TABLE B-continued

| | | |
| --- | --- | --- |
| Number of paging sub frames used for paging within a Paging Frame | $N_S$ | max(1, nB/T) |

Paging Frame Number = SFN mod T = (T/N) * (UE_ID mod N)
Paging Occasion is a function of i_s, $N_S$ and Predefined Sub frame pattern One challenge with the Next Generation of Radio Access (often referred to as New Radio or NR) is related to UE processing complexity and power consumption. Legacy LTE UEs typically use a time-based algorithm to determine when they are minimally required and/or used to monitor any applicable control channel(s) (e.g., PDCCH) and/or a network-controlled activation/deactivation mechanism that may be used by the UE to retune the radio front end for additional power savings.

Legacy LTE allows for UE power savings through connected mode DRX and IDLE mode DRX procedures. In connected mode DRX, a UE monitors the PDCCH for defined time intervals defined by the on duration period. In IDLE mode DRX, a UE monitors the PDCCH periodically at specific time instances for potential paging messages received from the network. The respective algorithms ensure that a UE and the network have the same understanding of the subframes during which the UE is minimally required and/or used to monitor the respective control channels.

In legacy LTE, a UE may support network-controlled activation/deactivation of Secondary Cells (SCells), e.g., on a per component carrier basis.

These procedures have a number of shortcomings when considered for the 5G air interface due to the following new features or characteristics specific to NR including: (1) support for low latency from data available (DL/UL) to assignment/grant transmission, (2) support for multiple numerologies, which may result in support multiple control channels, and different timing than what is currently used in LTE (and different timings within NR as a result of the different numerologies, and (3) support for flexible spectrum allocation.

The following represent new challenges for UE power consumption. One challenge may be to support different numerologies, including symbol duration, subcarrier spacing, and TTIs of different, and possibly variable duration. NR may support a new set of services/QoS including some with high throughput ("eMBB") and some with very low latency requirements (1 ms RTT). Traditional DRX mechanisms may not be flexible enough to optimally handle same-UE transmissions at different time intervals (e.g., 1 ms vs 125 µs). In addition, legacy DRX mechanisms may not suffice to reach power usage targets. For example, support for low latency services may be challenging when configured with DRX as care may and/or must be taken to avoid introducing unwanted latency and/or creating situations where data may arrive for a UE while the UE is in DRX. The UEs may benefit from an efficient power savings mechanism.

Another challenge may be to support multiple control channels, including dependencies between channels. In LTE, a single control channel (e.g., PDCCH) is present over the entire bandwidth for a given cell. The duration of the control channel is typically 2 or 3 symbols. For NR, a UE may support reception of control information using multiple localized (to specific bandwidths) control channels. The structure may be useful to enable scaling of control channel resources as load increases and/or to facilitate the addition of new control channels tailored for specific features/services for easier forward compatibility.

Another challenge may be to support flexible/varying channel bandwidths (BWs). The channel BW for NR may increase to values beyond those of legacy LTE (e.g., more than 20 MHz) and may be UE-specific. UE power consumption can increase with the amount of bandwidth the UE is required and/or used to process in its baseband. Control channel monitoring procedures may control explicitly or implicitly the applicable channel bandwidth for a given UE.

Another challenge may be to support lean carriers. Control channel decoding in LTE relies on the presence of reference signals. For NR, the amount of "always on" signals may be minimized, for example mainly to reduce inter-cell interference, and/or to support improved network power savings (network DTX). A power savings mode for NR may consider more sparse use of reference signals.

While new control channel monitoring functions, operations and/or procedures may be used for NR, additional power savings mechanisms, functions, operations and/or procedures which go beyond control channel monitoring may be required and/or used in order to support URLLC and/or eMTC devices (, for example which may have more stringent battery requirements than LTE).

Rrepresentative UE Processing State

Definition of UE Processing State

The term state, or processing state, is generally used hereafter to refer to one or more states that pertains to behavior of a UE. The processing state may include one or more activity states which may be relevant to certain actions taken by a UE when a condition becomes true. This is not intended to restrict the applicability of the methods further described herein. An activity state(s) may be equivalent to or a subset of a processing state(s).

Representative UE-Autonomous Determination and Network-Controlled Transitions

In some methods, operations, and/or procedures, a UE may be configured to autonomously determine that the condition becomes true and that the UE should or is to perform such action(s) (e.g., UE-autonomous behavior). In lieu of or in addition to the autonomous determination by the UE, a UE may be configured to determine that the condition becomes true and that the UE should or is to perform such action(s) based on an explicit indication received from a signal or from a transmission from the network (e.g., based on network-controlled behavior).

Other Representative Characterizations of UE Processing State

A UE may be configured to operate under one or more processing states which define and/or govern the behavior of the UE. For example, a processing state may provide a set of minimal requirements in terms of UE behavior, such as behavior related to at least one of the following:

control channel processing, e.g., monitoring, reception, decoding and/or configuration management;

spectrum bandwidth processing, e.g., system/channel bandwidth tuning, frequency location adjustment (e.g., center frequency), baseband processing and/or configuration management. In some embodiments, the spectrum bandwidth processing may be applied for control channel regions and data channel regions together and/or separately, e.g., for a bandwidth part that consists of a group of contiguous physical resource blocks and/or for a portion of the system/channel bandwidth of a carrier;

beam management and processing, for example, establishment, maintenance and/or reception/transmission using control and/or data beams; and/or reference signal processing, e.g., measurement processing and configuration management.

Other Representative aspects/operations may include at least one of the following:

HARQ timing related aspects/operations;

processing or activity level may control UE framing-related behavior(s), e.g. use of subframes versus slots versus mini-slots;

framing and/or timing related aspects/operations, e.g. different numerologies, transmission duration, scheduling occasions, subframe, and/or slot and/or mini-slot operation and/or HARQ timelines may be associated (e.g. active) with different processing states.

In some embodiments using a subframe-based DRX Active Time, a UE may be configured to monitor a control channel at a first (e.g. low) timing granularity while in a first processing state (e.g. low processing state) for a control channel, for example to enable: (1) a first specific numerology (e.g. 1 ms transmission duration), (2) a specific set of scheduling occasions (e.g. 1 ms subframes), and/or a HARQ timeline (e.g., a specific value x between scheduling and UL transmission, UL/DL transmissions and associated DL/UL feedback respectively, HARQ RTT, etc.).

For example, a UE may be in a low processing state using a 1 ms transmission duration with 1 ms scheduling occasion with x1 ms UE/eNB processing delay such as x=3 leading to an 8 ms RTT for a HARQ process.

The smallest time unit in OFDM systems may be generally referred to as a "symbol." A symbol has a symbol duration. In LTE, there may be 14 symbols per 1 ms subframe such the symbol duration is $\frac{1}{14}$ ms. The symbol duration may be a function of the numerology used for the carrier which may be the same in LTE.

In another embodiments using a slot-based DRX Active Time (e.g., in accordance with a slot duration and/or a mini-slot duration), a UE may be configured to monitor (e.g., additionally monitor) the control channel using a second (e.g. high) timing granularity while in a second processing state (e.g. high processing state) for a control channel, for example to enable a second numerology (e.g., mini-slots of one or a few symbols, e.g., of or about a 125 μs transmission duration), a specific set of scheduling occasions (e.g., scheduling occasions of one or a few symbols or one or a few mini-slots), and/or HARQ timeline (e.g. a specific value x2 between scheduling and UL transmission, transmissions and feedback, HARQ RTT, etc.). For example, a mini-slot may refer to a duration equal to 1 or more symbols, a slot may refer to a duration equal to a number of symbols (e.g., 7 symbols) and a subframe may refer to a plurality of slots (e.g., two slots per subframe). Depending on the numerology, the time duration may differ for any of: the mini-slot, slot and/or subframe. For a numerology equivalent to that of LTE, the same time durations is applied (e.g., is always applied). In certain representative embodiments, the numerology for a default carrier may support the LTE numerology.

For example, a UE may be in a high processing state with slot transmission durations of 1 ms and mini-slot transmission durations of 125 μs and with corresponding reception of control signaling at the mini-slot boundary, for example to enable different HARQ timelines as a function of the received control signaling. The transmission durations, control signaling and HARQ timelines may impact the types of DCIs decoded in the first and/or second processing states, for example:

logical channel properties and/or configuration; and/or low-cost signal monitoring configuration and/or behavior as described herein, for example, in the Control Channel Decoding Complexity section.

In some embodiments, any of the above aspects, operations, procedures, functions and/or characteristics of UE Processing State may be organized and/or structured using a pattern over a pre-defined period of time. The start of the pattern may be configurable using a well-defined and/or well-known reference in time. For example, the UE may be configured with a reference related to a system frame number, system timing, frame timing, and/or relative to reception of a specific signal. For example, such a signal may consist of and/or include a reference signal, e.g., associated with the channel for which the pattern is applicable. The pattern may be configurable and/or well-defined between a UE and a network. For example, the UE may be configured to determine an applicable pattern from a table of standardized values and/or from reception of signaling including pattern information, e.g., such that the UE's behavior is synchronized in time and predictable from the perspective of the network.

In some embodiments, a UE may be configured to adjust control channel processing and/or spectrum bandwidth processing according to a pattern-based configuration for a given processing state, and the UE may be configured to adjust other aspects including spectrum bandwidth processing such as beam processing as a function of a change of the UE's processing state, for example according to other methods, operations and/or procedures described herein.

In some embodiments, a UE may be configured with a first pattern for reception and blind decoding of one or more control channels. In certain embodiments, the UE may be configured to determine (e.g., and to perform) blind decoding attempts using different control channels (e.g., one or more control channels) from one control channel scheduling opportunity/occasion to another channel scheduling opportunity/occasion according to a pattern. For example, the UE may be configured to decode a first control channel in scheduling occasions 3 and 6 from a sequence of 10 occasions (e.g., numbered 0 to 9), while the UE may be configured to decode a second control channel during other occasions for a first processing level. For a second processing level, the UE may not be configured to decode any of the control channels for occasions 0, 1, 2, 8, and 9.

In other representative embodiments, the UE may be configured to determine (e.g., and to perform) blind decoding attempts using a different set of control channel resources (e.g., CORESETs), CCEs, search spaces, and/or the like, for a given control channel from one control channel scheduling opportunity/occasion to another control channel scheduling opportunity/occasion according to a pattern.

In other representative embodiments, the UE may be configured to determine (e.g., and/or to receive) a specific frequency location and/or bandwidth for a given numerology, e.g., a bandwidth part for a given control channel from one control channel scheduling opportunity/occasion to another control channel scheduling opportunity/occasion according to a pattern. For example, the UE may be configured to receive on a single (e.g., default) bandwidth part and/or CORESET for a first processing level. For a second processing level, the UE may be configured to receive on all configured bandwidth parts and/or CORESETs.

In certain representative embodiments, the UE may be configured to determine (e.g., and to perform) blind decoding attempts using different aggregation levels (AL) from one control channel scheduling opportunity/occasion to another control channel scheduling opportunity/occasion according to a pattern. The UE may be configured to decode a control channel using only, e.g., AL=16 in scheduling occasions 3 and 6 from a sequence of 10 occasions (e.g., numbered 0 to 9) and using AL=4, 8 in scheduling occasions 4 and 5, and may be configured not to decode otherwise for a first processing level. For a second processing level, the UE may be configured to decode in all occasions according to AL=16. The AL may be configured based on load of a control channel, a UE geometry, etc.

In certain representative embodiments, the UE may be configured to determine (e.g., and to perform) blind decoding attempts using different sets of one or more DCIs from one control channel scheduling opportunity/occasion to another control channel scheduling opportunity/occasion according to a pattern.

In some representative embodiments, the UE may be configured to determine (e.g., and to perform) reception and/or bandwidth processing, e.g., system/channel bandwidth tuning using different sets of physical resource blocks from one control channel scheduling opportunity/occasion to another control channel scheduling opportunity/occasion according to a pattern.

The pattern may correspond to a specific amount of time (e.g., in symbols, in millisecond, and/or in scheduling opportunities/occasions) which may be periodically recurring in time.

The start of the pattern may correspond to a specific time instant (e.g., the first symbol of a mini-slot, slot, and/or subframe), for example relative to a system frame number, to the first subframe of a frame, or to a received signal (e.g., a reference signal) which may be periodically recurring in time or to a successfully decoded transmission (e.g. a DCI, or a MAC CE).

In some embodiments, a UE processing state may be associated with one such pattern, for one or more such aspects, operations, procedures and/or characteristics. The UE may be configured to change an applicable pattern for one or more concerned aspects, operations, procedures, and/or characteristics when changing an applicable processing level.

A UE may be configured to receive control signaling that configures the UE's operating processing state, e.g., according to one of multiple processing states. A processing state may be associated with a defined set of properties related to one or more of the configurations described above. For example, a processing state may be associated with a specific control channel configuration, a data bandwidth and/or usage configuration, etc. The properties associated with a processing state (e.g., each processing state) may be pre-defined, e.g. by means of specifications, lookup table, rules and/or may be dynamically signaled and/or set. In certain representative embodiments, the UE may be configured with properties of a processing state based on the reception of signaling (e.g., RRC signaling) either through broadcast or dedicated signaling. Such signaling may be associated with a specific control channel monitoring configuration, data bandwidth configuration and/or usage, HARQ timing configuration, etc. for a specific processing state.

A processing state may be associated with an index or identifier to identify that specific processing state and reference that processing state for signaling, for example between a UE and the network.

Triggers for Changing Between Processing States
Network-Controlled Transitions

A UE may be configured to determine that the UE should or is to move to a different processing state based on the reception of signaling from the network, such as at least one of an RRC message, a MAC CE, a DCI message, for example on the control channel, a "low cost" signal as described herein, for example in Data Bandwidth Configuration section, and Timer-based operation as controlled by reception and/or configuration of control signaling.

The timer-based operation may be controlled by signaling from the network. For example, in one representative embodiment when a timer is used to control a UE's behavior, the UE may perform procedure/logic operation(s) A when a timer is running, and otherwise the UE may perform procedure/logic operation(s) B. In another representative embodiment, the timer itself may be controlled by reception of signaling (e.g. the timer may be stopped if control message X is received, and may be restarted if control message Y is received, etc.).

In some embodiments, a timer may be configured to control a UE's behavior. For example, when the timer is running, the UE may perform a set of procedure/logic operation(s). Otherwise, the UE may perform another set of procedure/logic operation(s) when e.g. the timer itself may be controlled by reception of signaling (e.g. the timer may be stopped if a control message Xis received from the network, and may be restarted if a control message Y is received from the network, etc.).

Such signaling may identify the index of the processing state to be configured, as well as potentially the time at which the change in the processing state should take effect. Alternatively, a change in the processing state may take place at a predefined or statically defined time difference between the time at which the transition message is received and the time at which the configuration changes associated with the new processing state should take place.

UE-Determined Transitions

In another embodiment, a UE may be configured to transition between one processing state and another processing state based on some defined trigger(s) related to UE operation, such as at least one of the followings: 1) scheduling activity, increase, or decrease in scheduling activity for one or more control channels, 2) arrival of a new service at the UE, e.g. initiation and/or configuration thereof, 3) availability for transmission and/or successful reception/transmission of data at the UE having specific properties (e.g., low latency requirements), 4) data in the UE buffers exceeding a threshold or dropping below a threshold, for example, for at least one of: specific bearer(s); bearer type(s); service(s); a type based on, e.g. a QoS profile; a SOM, a TrCH, and any equivalents, 5) expiry of a timer related to UE activity or scheduling activity, 6) UE speed exceeds or is below a certain value, 7) current battery life reaching a specific value; 8) triggering and/or initiation of a scheduling request and/or an access procedure; 9) initiation and/or transmission autonomously initiated by a UE, e.g. a contention-based uplink transmission, a grantless transmission, a scheduling request on an uplink control channel or a preamble on PRACH; 10) state of a HARQ process, e.g. exceeding some latency criteria/threshold in time and/or in terms of a number of retransmissions for a HARQ process; and 11) state of beam management, e.g. change of beam, change of beam configuration, beam failure event occurrence, and/or successful transmission of beam recovery request.

In some embodiments, a UE may be configured to determine the above events for transitioning between one processing state and another processing state based on timer configuration and operation, such as when a timer is (re-) started upon receiving corresponding control information and when the timer expires.

In another embodiment, a UE may be configured to determine the above events for transitioning between one processing state and another processing state based on counters (e.g., based on occasions for reception of control signaling or based on transmissions performed).

In such case, the transitions between processing states may be well defined based on certain rules. For instance, a specific trigger coupled with a source (e.g., existing or initial) processing state may use or require a transition to one specific destination state.

A UE may also be configured to request a change of the processing state using an RRC message, MAC CE, or PHY layer signaling. A request for the change in processing state may contain or include at least one of the following information: state index of the state to which a UE wishes to transition (or potentially a list of desired state indices), and parameters associated with the trigger for the state transition, such as, specific triggering event that triggered the change in the processing state, buffer occupancy, potentially of a specific logical channel or a specific type of data, channel measurements, beam measurements, a beam management event (e.g. beam switch, change of best beam), beam recovery, and requested duration in the target state.

A UE may be configured to request a change of processing state as a result of at least one of the following triggers: scheduling activity, increase, or decrease in scheduling activity on one or more control channels, arrival of a new service at a UE (e.g. initiation and/or configuration thereof), availability for transmission and/or successful transmission/reception of data at a UE having specific properties (e.g., low latency requirements), data in UE buffers exceeds a threshold or is below a threshold, expiry of a timer related to UE activity or scheduling activity, UE speed exceeds or is below a certain value, beam failure occurs, and current battery life reaches a specific value.

The sections which follow describe specific cases of processing state changes based on specific UE configuration related aspects, operations, procedures and/or functions. The specific triggers mentioned above, and more detailed triggers defined for each and/or certain specific configuration aspect are possible.

Control Channel Decoding Complexity

The embodiments described herein are equally applicable to any data channel resources (e.g., PRBs, bandwidth, beam selection, framing aspects (e.g. slots and mini-slots) if applicable) unless explicitly stated otherwise. Possibly, such applicable data channel resources may, instead or additionally, be determined as a function of the UE's state. The UE's state may be used to determine control channel resources, in particular, when different control channel resources are used to control different spectrum blocks for data transmissions.

UE Monitoring a Control Channel with Varying Number of CCEs

In one embodiment, as part of a UE power savings mode, the UE can be configured to monitor a different set of CORESETs and/or of CCEs depending on its operating mode, e.g., its processing state or activity state, and may be configured to change operating mode autonomously with time.

A UE's current processing state may be configured to define the control channel monitoring configuration for that UE. A UE may be configured to process (e.g., monitor, receive, blind decode or similar) a control channel with a varying number and/or sets of CCEs. For example, the number of CCEs that may be changed and/or the actual CCEs to be used for the processing may be changed. For example, a UE may be configured to operate in different processing states of varying complexity and the UE may monitor the control channel over a different number of CCEs and/or different sets of CCEs. For example, a UE may be configured to perform a power saving mode that varies the number of CCEs. The UE may need to, is to and/or needs to monitor based on certain factors, which factors may include scheduling processing and/or UE buffer status. Buffer status on a UE may be coordinated with flexible scheduling between the UE and eNode-B.

A UE may be configured to perform control channel monitoring by considering multiple processing states, each processing state having a different number of CCEs to be decoded. One possible benefit is a potential reduction of control channel monitoring complexity.

For example, a UE may be configured to autonomously determine different sets of control channel resources to monitor based on at least one of the following.

In one embodiment, a UE may be configured to monitor a sub-band, multiple sub-bands, a subset of the frequency band, a subset of a system bandwidth, a frequency location (e.g., center frequency) or subset of resources of the control channel. This may include Aggregation Levels.

While in a first state (e.g., according to a first activity level), a UE may be configured to monitor a control channel defined over a first set of resource elements, a first set of applicable aggregation level(s), resource blocks, or the like, for example, for a first set of one or more control channel(s). A UE may then be configured to use a second set of resources (including possibly a different number of control channels) when operating in a second state (e.g., according to a second activity level).

For example, in such first state, a UE may be configured to monitor for downlink control information (e.g., DCIs) on a first operating band. For example, such may include a first channel bandwidth. In a second state, the UE may be configured to monitor for DCIs which may occupy a different subset of resource elements than the first operating channel bandwidth.

For example, in such first state, a UE may be configured to monitor for DCIs on a first set of control channels. Such first set may provide scheduling for up to a first user plane data rate. The UE in a second state may be configured to monitor for DCIs on a second set of control channels. Such second set may provide scheduling for up to a second user plane data rate. A UE may be configured to determine such set as a function of one or more aspects related to the UE's transmissions such as described further below.

A UE may be further configured to further operate over a first and a second sub-band (or set thereof) of the operating frequency band when in a first and in a second state, respectively. Possible advantages of such operation on power consumption may be that the receiver may utilize at least one of a reduced Fast Fourier Transform "FFT" size for control channel decoding and a front-end tuned (e.g., only tuned) to a sub-band of the entire frequency band.

Figure 5A:
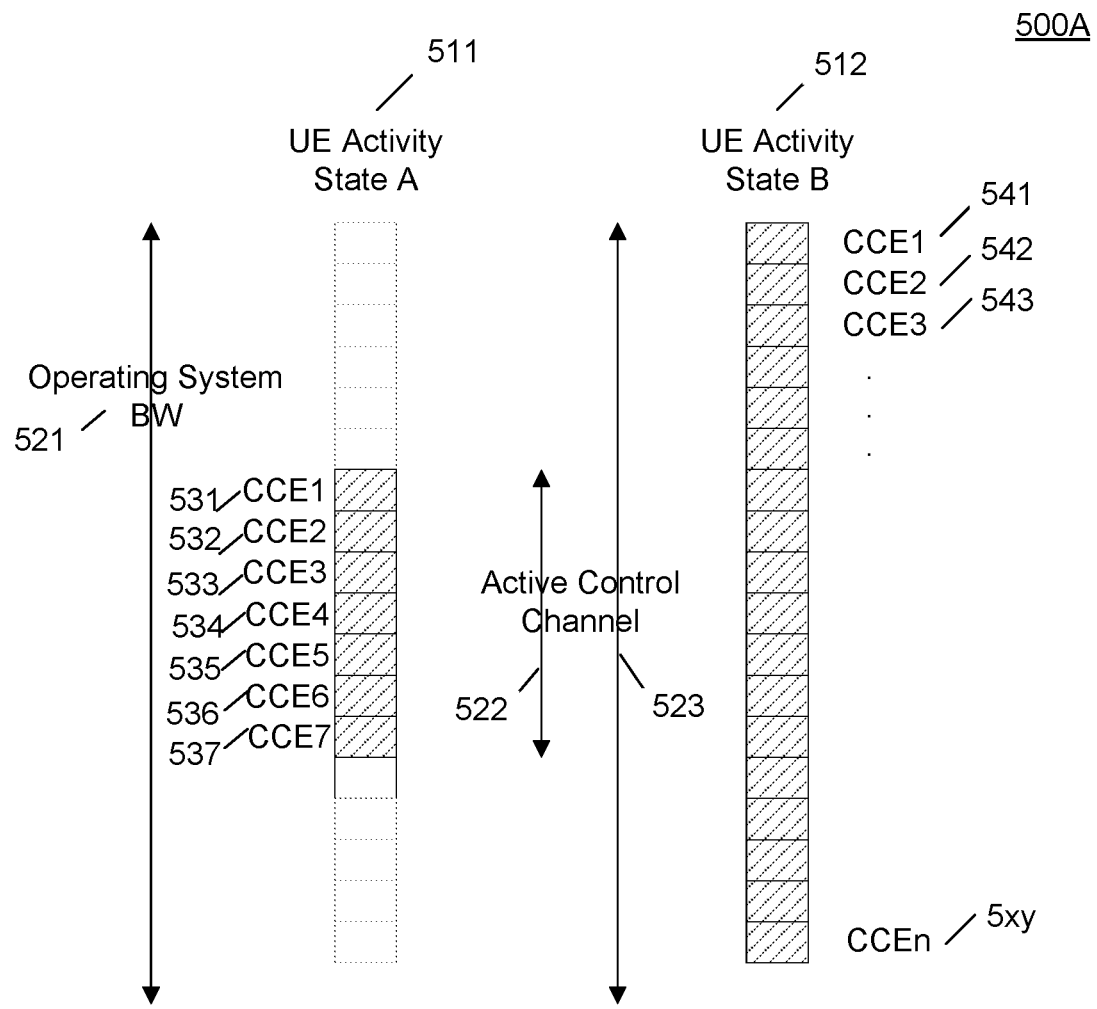
FIG. 5A is a representative diagram illustrating UE monitoring of control channels in two different activity states.

FIG. 5A is a representative diagram illustrating the control channels monitored by a UE in an activity state A (shown at 511) and an activity state B (shown at 512), respectively. As illustrated at 511, a UE in activity state A may be configured to monitor a certain number of control channel elements, e.g., CCE 1-CCE 7 (531-537) over an operating system bandwidth 521. These control channel elements, e.g., CCE 1-CCE 7 (531-537), represent active control channel 522 for the UE. The UE may be configured, at other times, to be in an activity state B. However, when in a different activity state, e.g., activity state B, the UE may be configured to monitor the entirety of the control channel elements, e.g., CCE 1-CCEn (541-5xy) that represent active control channel 523 over an operating system bandwidth 521, as shown at 512.

Figure 5B:
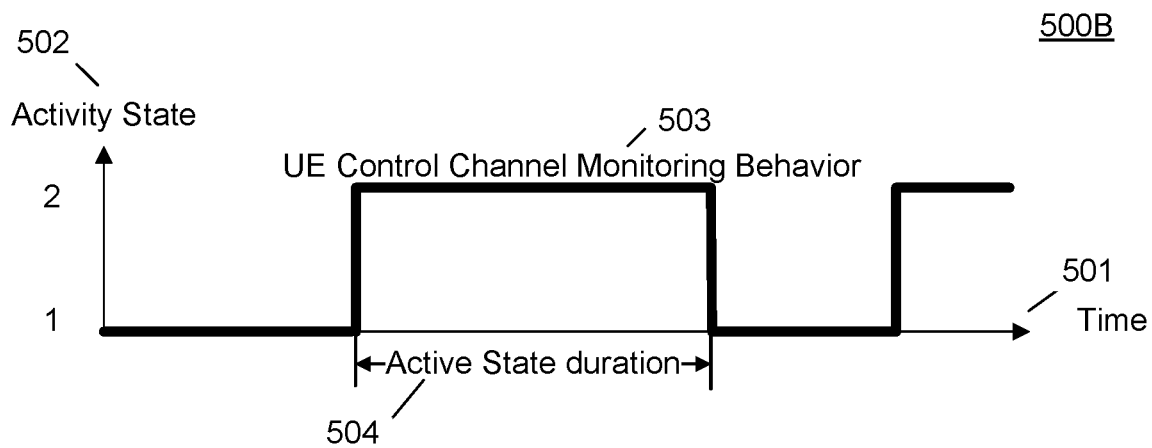
FIG. 5B shows a representative monitoring cycle including control channel monitoring behavior on the UE.

FIG. 5B illustrates a representative monitoring cycle including control channel monitoring behavior on the UE. The UE may be configured to monitor the control channels during Active State duration 504 and to not monitor the control channels at other times. The Active State duration 504 can be configured subject to an activity state of the UE and transmitted via RRC signaling.

Reduction in the Number of Blind Decodings

In another embodiment, a UE may be configured to, in a first state, perform up to a first number of blind decoding attempts. In a second state, the UE may be configured to perform up to a second number of blind decoding attempts. The determination of the UE's state may be based on the associated set of control channel resources. For example, for a first and a second state, respectively, the UE may be configured to process, respectively, a first and a second number (or subset) of search spaces, a first and a second set of search spaces, search space aggregation level, or similar. A search space may be equivalent to that of legacy LTE, or may be more generally any collection of control channel resources that a UE uses to perform blind decoding for downlink control channel messages. For NR, such search spaces may be defined in time, frequency and/or space, if beamforming is applicable to a control channel.

A possible advantage of varying the UE's blind decoding complexity, e.g., dynamically, may be that it may allow a UE that is to be scheduled by the network less frequently (or with less critical scheduling time requirements) to reduce the power consumption associated with blind decoding during that period of time, while increasing the power under the control of the network scheduler during the times in which the UE may need to, is to and/or needs to be actively scheduled and/or during a period of higher scheduling load in the system such that scheduler flexibility can be preserved.

A state in which the UE performs decoding of fewer control channel resources would therefore be better suited for periods of low scheduling activity, and/or periods of scheduling activity related to best-effort, delay tolerant services. A state in which the UE is required and/or used to decode a larger number of control channels would be a larger scheduling flexibility state.

Figure 6A:
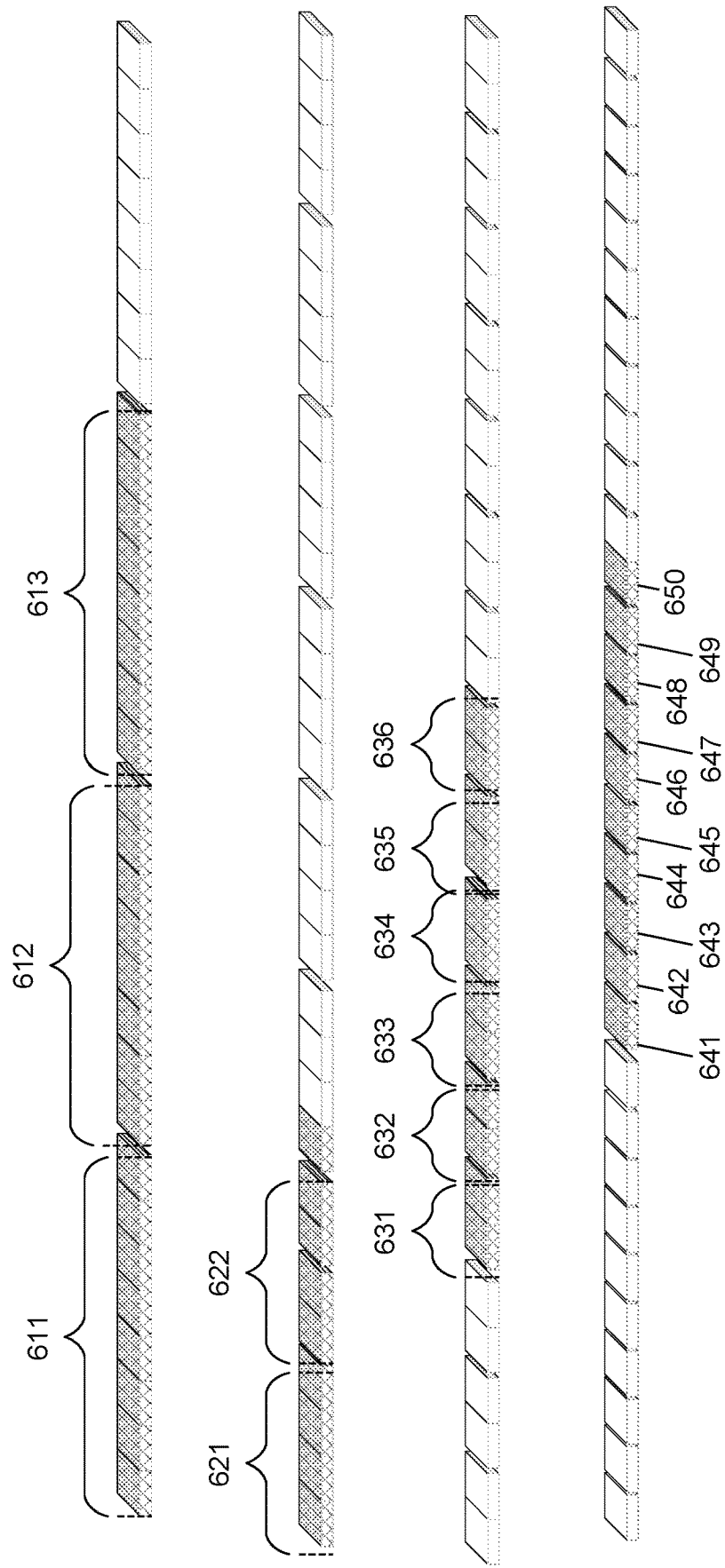
FIG. 6A is a representative diagram of search spaces for a UE in activity state A.

FIG. 6A is a representative diagram of search spaces for a UE in a representative activity state A. The UE may be configured to search spaces with a number of control channel elements while in activity state A. For example, the UE may be configured with a search space consisting of the first three aggregation level 8 (e.g., 611-613), in which the aggregation level 8 includes eight control channel elements. The UE may also be configured with another search space with the first two aggregation level 4 (e.g., 621 and 622), in which the aggregation level 4 includes four control channel elements. A UE may also be configured with another search space with the $4^{th}$ to $9^{th}$ aggregation level 2 (e.g., 631-636), in which the aggregation level 2 includes two control channel elements, or with the $12^{th}$ to $21^{st}$ aggregation level 1 (e.g., 641-650), in which the aggregation level 1 includes one control channel element.

Figure 6B:
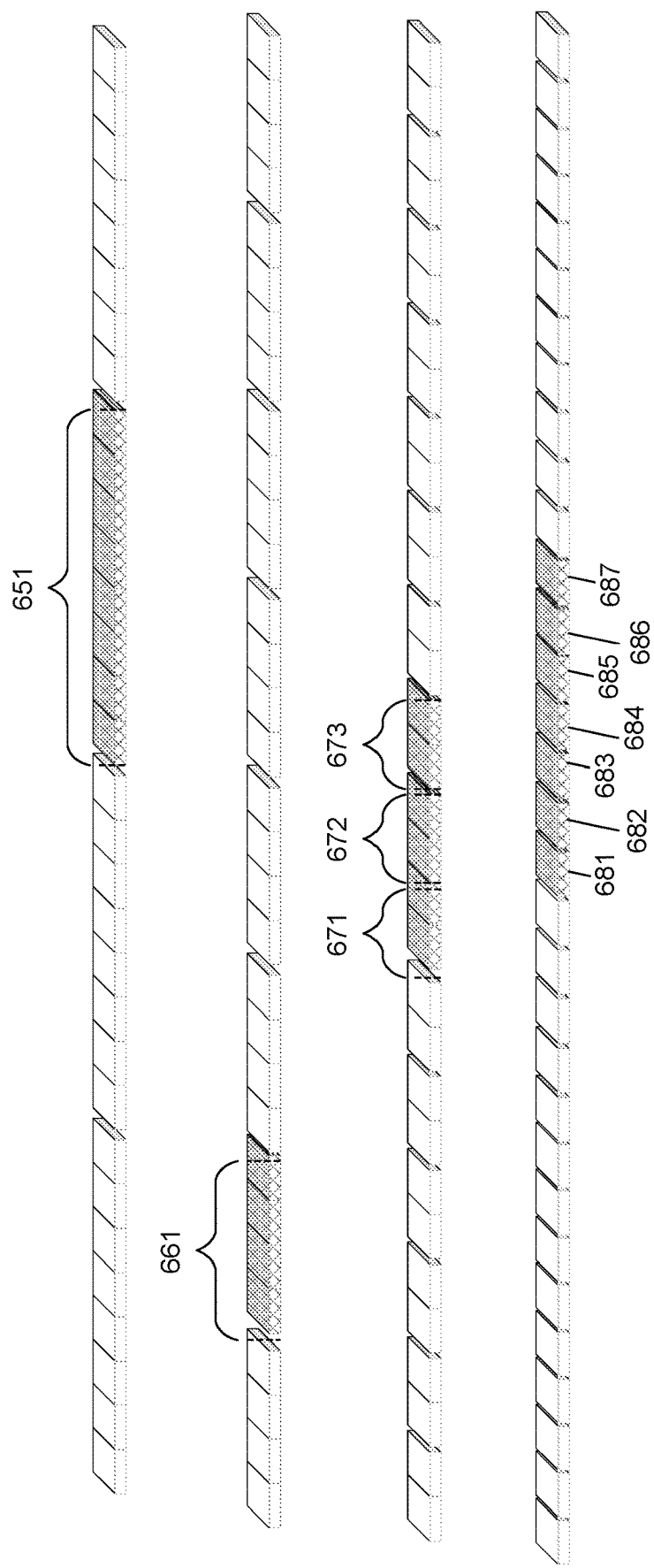
FIG. 6B is another representative diagram of search spaces for a UE in activity state B.

FIG. 6B is a representative diagram of search spaces for a UE in activity state B. A UE, however, may be configured to minimally search spaces, in different ways from FIG. 6A, with a different number of control channel elements in activity state B. For example, a UE may be configured with a search space with the $3^{rd}$ aggregation level 8 (e.g., 651). A UE may also be configured with another search space with the second aggregation level 4 (e.g., 661). A UE may also be configured with another search space with the $7^{th}$ to $9^{th}$ aggregation level 2 (e.g., 671-673) or with the $5^{th}$ to $21^{st}$ aggregation level 1 (e.g., 681-687).

UE Monitoring a Control Channel with Varying Number of Control Channel Messages

In another embodiment, as part of a UE power savings mode, a UE may be configured to search for a different number of control channel messages depending on its operating mode, and may be configured to change operating mode autonomously.

A UE may be configured, or expected, to monitor a control channel with a different number of possible control channel messages that may be received by the UE. For example, a UE may be configured to operate in different states of complexity and the UE may monitor the control channel with different numbers of control channel messages that can be received. For instance, the UE may be configured to perform a power saving mode that varies the number of distinct control channel messages the UE may need to, is to and/or needs to monitor based on factors such as one or more of scheduling activity, UE buffer status, and eNode-B scheduling flexibility requirements.

A UE may be configured to perform control channel monitoring by considering multiple states, having varying number of control channel messages (e.g., each having varying number of control channel messages) to be decoded in a state (e.g., each state). In the state (e.g., each state), the UE may be configured to be required and/or used to decode for a different number of control channel messages. This may include at least one of: a different number of DCI messages, different distinct DCI message sizes, different number of Cyclic Redundancy Check (CRC) patterns to use, and different number of matching sequences, such as correlation sequences, used as part of the decoding.

For example, a mode of operation associated with low power (e.g., fewer number of DCI message sizes compared to other modes) may be associated with control channel messages which allow UE operations such as, but not limited to, paging, power control, system information, low-latency data transmission, initial data transmission.

The advantage of reducing the number of distinct control channel messages may be to improve the performance of fewer blind decodings for the UE for saving power during these time instances. The states, wherein the UE performs decoding of fewer control channels, may be lower power states, while the states where the UE is required and/or used to decode a larger number of control channels would be a larger scheduling flexibility state.

Transition Between States

In one embodiment, the determination of when to transition between two activity states may use similar behavior as the legacy LTE DRX Active Time.

In another embodiment, the power savings mode at the UE may be based on the transitions by the UE between the different states. A UE may be configured to transition between two control channel monitoring states based on certain triggers. For instance, a UE may be configured to move from a first activity state to a second activity state which may have different decoding complexity. The UE may be further configured to further evaluate such triggers periodically, such as at every TTI, at every N subframes, or with some configured periodicity.

For example, such transitions between states may be based on one or more of the following triggers: 1) scheduling intensity, 2) resources or messages used for scheduling, 3) trigger of time, 4) request by the UE, 5) presence or absence of reference signal, and 6) explicit indication by the eNode-B.

1) Scheduling Intensity

A UE may be configured to move between one control channel monitoring state to another as a result of the number of grants received in a given state, measured over a time window or at a specific time, and based on some rules for transitions which are related to the number of grants. These rules may take on different forms, or combinations of the followings:

In one embodiment, the rules may be based on the number of grants received in a period T.

In a second embodiment, the rules may be based on the number of consecutive grants received. For example, a UE may be configured to move from a lower power state to a state with larger scheduling flexibility upon the reception of N consecutive grants while in the lower power state, or upon the reception of N grants received during a time period T while in the lower power state.

In a third embodiment, the rules may be based on the number of consecutive control channel opportunities in which the UE was scheduled, or the UE was not scheduled. For example, the UE may be configured to move from a state with larger control channel monitoring complexity to a lower power state after N subframes in which the UE was not scheduled on the control channel.

In a fourth embodiment, the rules may be based on the type of control channel message which is sent while in one state. For example, the UE may be configured to move from one state to another when receiving a specific DCI message type, or when receiving a control channel message in a specific search space or with a specific aggregation level. Such DCI message type or search space usage, etc. may therefore be reserved to implicitly signal a change in the state.

In a fifth embodiment, the rules may be based on the beam or set of beams in which the UE receives messages while in one state. For example, the UE may be configured to move from one state to another state when receiving a DCI message for example, while using a specific subset of monitored beams.

2) Resources or Messages used for Scheduling

A UE may be configured to transition between states upon the reception of N consecutive grants which use a specific search space, search space size, or specific DCI message 3) Trigger of Time A UE may be configured to transition between states at a specific time instant (e.g., at a specific subframe, or frame number) which may be known by the UE or may be configured by the network. For example, the UE may be configured to always transition between one mode and another periodically at a specific frame/subframe number. For another example, the UE may be configured to operate in one mode for a period of time (based on a timer) and transition to another mode at expiry of the timer.

4) Request by the UE

A UE may request to move between states by issuing a request using SR, Buffer Status Report (BSR), MAC CE, or RRC message.

A UE may trigger a request to move between two states as a result of at least one of the followings:

initiation or termination of a new service at a UE. For example, a UE with an active eMTC service operating in low-power mode may request to move out of low-power mode upon initiation of an eMBB service, arrival of data associated with a specific service, logical channel, or flow, determination, by a UE, that data to be transmitted is time critical, or may not meet time requirements without moving out of low-power mode, buffer status of one or more logical channels or flows at a UE exceeds a certain threshold, time criticality (e.g., Time to live) of data in UE buffer, or transmissions ongoing at a UE goes below a threshold (e.g., a UE has completed transmission of any or most of the time data (e.g., time critical data) in its buffers), and beam management process or event (e.g., a beam failure detection at the UE). The Beam management process or event may include determination by the UE that radio link quality associated with a set of beams is below a specific threshold. For example, the UE may determine such radio link quality based on one or more measurements for references signals associated with the set of beams.

A UE may be configured to implicitly indicate its request to move between states by sending information in an SR (e.g., by a transmission on the PRACH and/or on the Physical Uplink Control Channel (PUCCH)), a BSR, a MAC CE, and/or a RRC message (e.g., using a transmission on PUSCH). For instance, a UE may assume that sending a BSR with information that the buffer status or timing requirements for data in a specific logical channel are above a threshold will move the UE out of or into low-power mode.

5) Presence or Absence of Reference Signal

A UE may be configured to determine that the UE may need to, is to and/or needs to monitor a subband of the control channel space as a result of the absence of reference signals in other parts of the band. For instance, the operating band may be divided into several subbands where a set of reference signals may be transmitted in that subband. If a UE detects that the reference signal power in a specific subband is below a threshold, the UE may be configured to ignore decoding of control channel for that specific subband, and decode the control channel on the subbands (e.g., only on the subbands) where the reference signal power is above a threshold.

6) Explicit Indication by the eNode-B

A UE may be configured to move between different states if the DCI explicitly or implicitly indicates it. For example, a UE may be configured to move from the low-power state to the normal state, or from the low-power state to another low-power state (having higher complexity), if the DCI indicates a grant for resources that are located outside of the reduced bandwidth defined by the initial low-power state where the UE is received.

A UE may be configured to move between states upon reception of a MAC Control Element (MAC CE) or RRC configuration message.

A UE may be configured to determine a state and/or a set of resources (control and/or data) as a function of at least one of the followings:

One function would be average transmission rate during a period of time. Such rate may correspond to a L1 transmission rate, to a L2 transmission rate, to user plane data transmission rate or similar. Such rate may be based on the successful transmissions during such period. Such rate may be based on successful transmissions for which a positive HARQ feedback was received (for downlink scheduling) or transmitted (for uplink scheduling) or both (for combined scheduling). With a configured offset or threshold, the threshold may be used to vary scheduling flexibility.

Another function would be average inter-packet transmission (uplink or downlink or both). Such transmissions may be according to the above description.

Another function would be a rate-control algorithm e.g., such as a multiplicative increase/subtractive decrease type of algorithm. For example, a TCP-like rate control may be applied to determine the (e.g., activity) state for control channel processing (and, for example, data channel processing) whereby the management of the TCP "window" corresponds to a minimum processing requirement for a UE and whereby such window is however increased in a multiplicative manner and decreased in a subtractive manner (contrary to TCP's rate control). For example, the successful detection of a DCI (or of a number within a given period) would correspond to reception of a TCP ACK in terms of window management (multiplicative increase) while a period without such detection (or of a number less than a certain value within a given period) would correspond to a TCP NACK (subtractive decrease). This could be averaged using a window to minimize the variation in rate. One advantage of such method may be that UE processing activity could match the observed transmission rate of the given UE. Such methods may be applied separately for uplink (e.g., for resources associated with an uplink data channel, for example only the uplink data channel), downlink (e.g., for resources associated with downlink control and/or data channel(s) only) or in combination for both (otherwise).

One advantage of having a UE autonomously modify the control channel configuration may be that the UE allows reduction in overhead of signaling from the network to enable such transitions between one activity state and another, allowing the transitions to occur more frequently without overhead and therefore improving the power efficiency gain with such transitions.

In one embodiment, a UE may be configured to decode one set of search spaces (potentially a full set) in a normal mode, and a second set of search spaces (potentially a reduced set) in a low-complexity mode. The set of search spaces to be decoded in a mode (e.g., each mode) may be known a-priori by a UE or may be provided by configuration from the network. The configuration from the network may further be provided as an index (one for normal mode and one for low-complexity mode) to a known or standardized search space configuration. In low-complexity mode, the reduced set of search spaces may be further limited to a reduced set of CCEs, resources, beams, and/or control channel bandwidth, for example so that a UE may process the reduced (e.g., only the reduced) set of resources. A UE may be configured to receive a MAC CE to indicate that the UE should move from one mode of decoding to another mode. Upon successful reception of the MAC CE, the UE will start performing control channel decoding according to the new mode at the next control channel instant (e.g., next subframe), or at a specific known instant (e.g., subframe 0, or x subframes following reception of the MAC CE).

In another example embodiment, a UE may be configured with two different control channel decoding modes, where a first mode requires decoding of a small set of DCI formats, and a second mode requires decoding of the full set of supported DCI formats. A UE operating in the first mode may be configured to transition to the second mode upon receiving a scheduling request in N consecutive control channel occasions/TTIs/subframes or similar. Alternatively, a UE operating in the first mode may be configured to transition to the second mode upon receiving a DCI message of a specific type (supported in the first mode) N times within the last T subframes, where N and T can be configured by the network. Once in the second mode of operation, a UE may be configured to transition to the first mode of operation following expiry of a timer which is set upon entry to the second mode. The timer may be further reset a time (e.g., each time) a UE receives a scheduling request.

In another representative embodiment, a UE may be configured to follow any of the rules associated with the previous example embodiments and may be further configured to transition temporarily (e.g., for one or several subframes/TTI/scheduling opportunities) to the second mode of operation periodically once every T subframes at a time instance that is known by both the UE and the network (e.g., he UE may be configured by the network). The advantage of such a periodic fallback may be to ensure that the UE and the network remain synchronized in terms of the transition between the modes of operation. A UE, while at the subframe which falls back to the second mode of operation, may further receive a message from the network to re-synchronize itself with the network, which could consist of resetting all timers, counters and state variables related to the transition between the two modes.

Although the above representative embodiments have been shown for two states, one of skill in the art understands that examples and rules for transitions are possible for more than two control channel monitoring states. UE L2 PROCESSING COMPLEXITY HARQ Configuration In one embodiment, as part of UE power savings mode, a UE may be configured to autonomously change its HARQ configuration and inform the network of such.

UE's current activity state may define the HARQ configuration which a UE operates under. A UE may be configured to autonomously change its HARQ configuration based on specific triggers which occur at the UE. The HARQ configuration may define the values, rules, or configuration of the following properties or parameters related to HARQ:

1) the number of HARQ processes for DL, UL, SL. For instance, in an activity state associated with lower UE processing complexity, a UE may be configured with a smaller number of HARQ processes. One advantage may be that it may enable memory savings in a UE as buffering may be dynamically adjusted based on the UE's activity;

2) the applicable transmission mode. For example, in a first and in a second state a UE may be configured to use a configuration associated with a first and a second transmission mode, respectively. This may be useful to enable less processing intensive physical layer processing in periods of lower activity;

3) the mapping between logical channels and HARQ processes. For instance, in a specific activity state, there may be specific rules to follow for associating one or more logical channels with a specific HARQ process;

4) the timing of HARQ operations, such as grant to transmission timing or timing of retransmission;

5) whether autonomous or scheduled retransmissions are to be used;

6) the maximum number of HARQ retransmissions; and 7) configuration of the redundancy version for a HARQ transmission/retransmission (e.g., each HARQ transmission/retransmission).

In another embodiment, the power savings mode may depend on UE states, UE state transitions, or both, a state (e.g., each state) having a specific set of HARQ parameters or HARQ configuration. A UE may be configured to transition between the HARQ configuration states based on certain triggers. A UE may be further configured to evaluate such triggers periodically, such as at every TTI, at every N subframes, or with some configured periodicity. The transitions between states may be based on one or more of the following triggers described herein, for example in the Control Channel Decoding Complexity section.

Additional transitions which may be considered include reception of high priority or low-latency data. For example, a UE may be configured to receive a packet or PDU containing or including a priority that is higher than any current priorities of data that UE is currently transmitting. As another example, a UE may be configured to receive a packet or PDU having timing requirements or TTL associated with the packet which may use or require a different HARQ configuration.

Rules for transition between HARQ processing states may further be defined based on at least one of: the number of such packets received over a configurable amount of time, the size of the packets received, and the priority level or latency level associated with the packets.

With respect to the priority level or latency level associated with the packets, low latency data may, for example, be associated with different levels of latency (e.g., required latency) (e.g., L1, L2, . . . ) with decreasing latency requirements, and this level may be provided with the data from the upper layers.

Concatenation, Segmentation, Multiplexing and/or Retransmission

In another embodiment, as part of UE power savings mode, a UE can autonomously change its configuration of L2 segmentation, concatenation, and retransmission and inform the network of such.

A UE's activity state may define the behavior of the UE when performing concatenation, segmentation, and multiplexing of logical channels onto transport blocks. A UE may be configured to transition from one activity state to another state, where the activity state can be characterized by a different value of definition for the following parameters:

1) the minimum or maximum segment size for segmentation and/or re-segmentation;

2) whether or not segmentation should be performed, and if so, on which logical channels. For example, a UE may be configured in one activity state to perform segmentation on all logical channels, while in another activity state to not perform any segmentation, while in another activity state to perform segmentation (e.g., segmentation only) on a specific type of logical channel;

3) whether or not concatenation should be performed, and if so, on which logical channels. For example, a UE may be configured in one activity state to perform concatenation on all logical channels, while in another activity state to not perform any concatenation, while in another activity state to perform concatenation (e.g., concatenation only) on a specific type of logical channel;

4) the size of windows at the TX or RX used for operations of ARQ, reordering, retransmission, or similar operations, for all logical channels or for specific sets of logical channels;

5) whether to perform segment retransmission, or whether upper layer retransmission (e.g., only upper layer retransmission) of complete PDUs is performed; and 6) whether re-segmentation is performed for retransmissions, or whether retransmissions requires and/or uses transmission of the same segments as initial transmission.

In one representative embodiment of UE L2 Processing Complexity, a UE may be configured in a first mode with a HARQ configuration consisting of N1 parallel HARQ processes and x1 subframes between the transmission of data and ACK. Upon the initiation of a service using or requiring low-latency, a UE may be configured to receive a packet from upper layers which indicates (e.g., the need) to transmit the data with low latency. If the number of such packets received by a UE from the upper layers within a configurable time T exceeds a certain threshold, the UE may be configured to move to a second mode of operation.

The UE may be configured to additionally inform the network of the transition by transmission of a MAC CE (such as a BSR or similar) A UE may be configured to operate in a second mode which consist of or includes N2 parallel HARQ processes (where N2>N1) and x2 subframes between the transmission of data and ACK (where x2<x1). A UE may be configured to remain in the second mode while packets of the low latency service are being received. When the number of packets associated with the low latency received over a similar time interval T goes below a threshold, a UE may be configured to transition to the first mode, and similarly inform the network of such.

Data Bandwidth Configuration

Modification of Data Bandwidth Configuration

In one embodiment of modification of the Data Bandwidth Configuration, as part of UE power savings mode, a UE may be configured with a different set of operating bandwidth, depending on its processing state, and may be configured to change the processing state autonomously.

The set of triggers for processing state changes disclosed herein that determine control channel processing is applicable to data channel and data bandwidth configurations.

A UE's activity state may be defined in terms of its operating data bandwidth. In one solution, a UE may be configured to operate over a different data bandwidth and change its operating data bandwidth dynamically during operation. A UE may further operate under different data bandwidth configuration for UL and DL. For example, a UE may be configured with an operating bandwidth B 1 on carrier C (where the overall system BW for the carrier is B>B1). At some time, a UE may be reconfigured to change its operating bandwidth from B1 to B2 (B1<B2<B) to allow the UE to be scheduled with a larger amount of resources. The reconfiguration may consist of or includes the addition of resource blocks to the overall bandwidth (BW) that a UE can be scheduled with for data, and/or can utilize for UL transmission. It may consist of or include UE processing the entire B 2, which includes the additional resource blocks.

A UE may be configured to additionally change the location of the data bandwidth in frequency as a result of the bandwidth configuration. For instance, a UE may be configured to move the center frequency of its operating bandwidth from one location to another, based potentially on triggers related to channel quality of the specific resources, in addition to power consumption considerations. A UE may be configured to additionally change the usable time resources for DL reception and UL transmission based on certain triggers.

A UE may be further configured to make such dynamic changes in the bandwidth configuration during its operation in order to adapt to the instantaneous scheduling load (uplink or downlink) for that specific UE. A UE may be configured to make such changes in response to specific triggers related to scheduling, load, etc., as described in more detail below.

The advantage of such dynamic data bandwidth configuration change may be that a UE configured with a smaller bandwidth may configure its reception, data processing, measurements, etc. such that it is limited to that segment. For example, a change in the bandwidth configuration may result in a retuning by the UE. A UE may be configured to use a front-end, FFT/IFFT, or baseband processing that is limited to the segment. For example, a UE configured with bandwidth B 1 may utilize FFT size F1 to receive the data channel. When configured with bandwidth B2>B1, the UE may utilize FFT size F2>F1 to receive the data channel Such a configuration may allow for power savings advantages when UE's load requirements are not sufficient to warrant that the UE's receiving circuitry/HW/SW operates over the entire BW of a given carrier.

Identification of a UE Operating Bandwidth by Indexing

In another embodiment of identification of UE operating bandwidth by indexing, bandwidths or segments (including resource blocks and their configurations) may be predefined, or based on system information broadcast by the cell. A UE may be configured to receive a set of indices which correspond to one of the possible segments or bandwidths that may be utilized as the configured UE-specific BW for a given time, and reference made to that segment by the network will be made based on the corresponding index. Such indexing may be transmitted by the network to the UE during configuration, or may be signaled by the UE to inform the network in the case of UE autonomous changes in UE operating bandwidth.

Modification of Addressable/Allocable PRBs

In another embodiment of modification of the addressable/allocable PRBs, as part of UE power savings mode, a UE can be configured with a different set of addressable/allocable PRBs within its system bandwidth, depending on its operating mode, and may change operating mode autonomously.

A UE's activity state may be characterized by the addressable PRBs that can be used by the UE in the UL, or can be scheduled by the network for that specific UE in the DL. In another solution, a UE may be configured to change its addressable set of PRBs in UL or DL. A UE may be further configured to make such changes in the addressable set of PRBs based on the scheduling load, data to be transmitted, operating characteristics, and other characteristics specific to that UE. In doing so, a UE may be configured to obtain power savings associated with simplified control channel decoding, as the addressable space required and/or used for the control channel may be limited to the data (e.g., only the data) used by and/or needs of the UE. When modifying the set of addressable PRBs, a UE may be configured to continue to operate over the same data bandwidth, and may consider (e.g., only consider) certain PRBs as those of interest which can be addressed by the control channel.

A state transition and/or the modification of the addressable/allocable PRBs, may consist of and/or include the addition or removal of one or more PRBs to the number of addressable/allocable PRBs for a UE. Alternatively, the state transition and/or the modification of the addressable/allocable PRBs may consist of and/or include the change from one predefined PRB configuration to another PRB configuration. A PRB configuration may consist of and/or include at least one of the followings: 1) set of specific PRBs, 2) size of the PRBs (e.g., each of the PRBs) in the set, 3) allowable Modulation and Coding Scheme (MCS) that can be used in the PRBs (e.g., each PRB, 4) TTI, and/or numerology that can be used in a specific PRB, 5) allowable logical channels or services which are allowed to be used on a specific PRB in the PRB set, and 6) set of beams on which to receive the set of addressable PRBs.

Excluded PRBs in Data Channel Configuration

A UE may also be configured to receive from the network, a set of PRBs or data blocks which cannot be used in UE's data channel configuration. For example, a UE may be configured to exclude such PRBs in its data channel configuration. Furthermore, the location in frequency of such excluded data blocks may change with time, based on some predefined or configured hopping pattern.

Frequency Hopping Operation

A UE may be configured to determine its data block location (e.g., the resource blocks in the frequency band which may up a specific data block) based on a frequency hopping rule which may include at least one of: UE ID and frame or subframe number.

In this way, a specific data block may occupy different portions of the bandwidth at a specific time.

Figures 7A, 7B, 7C:
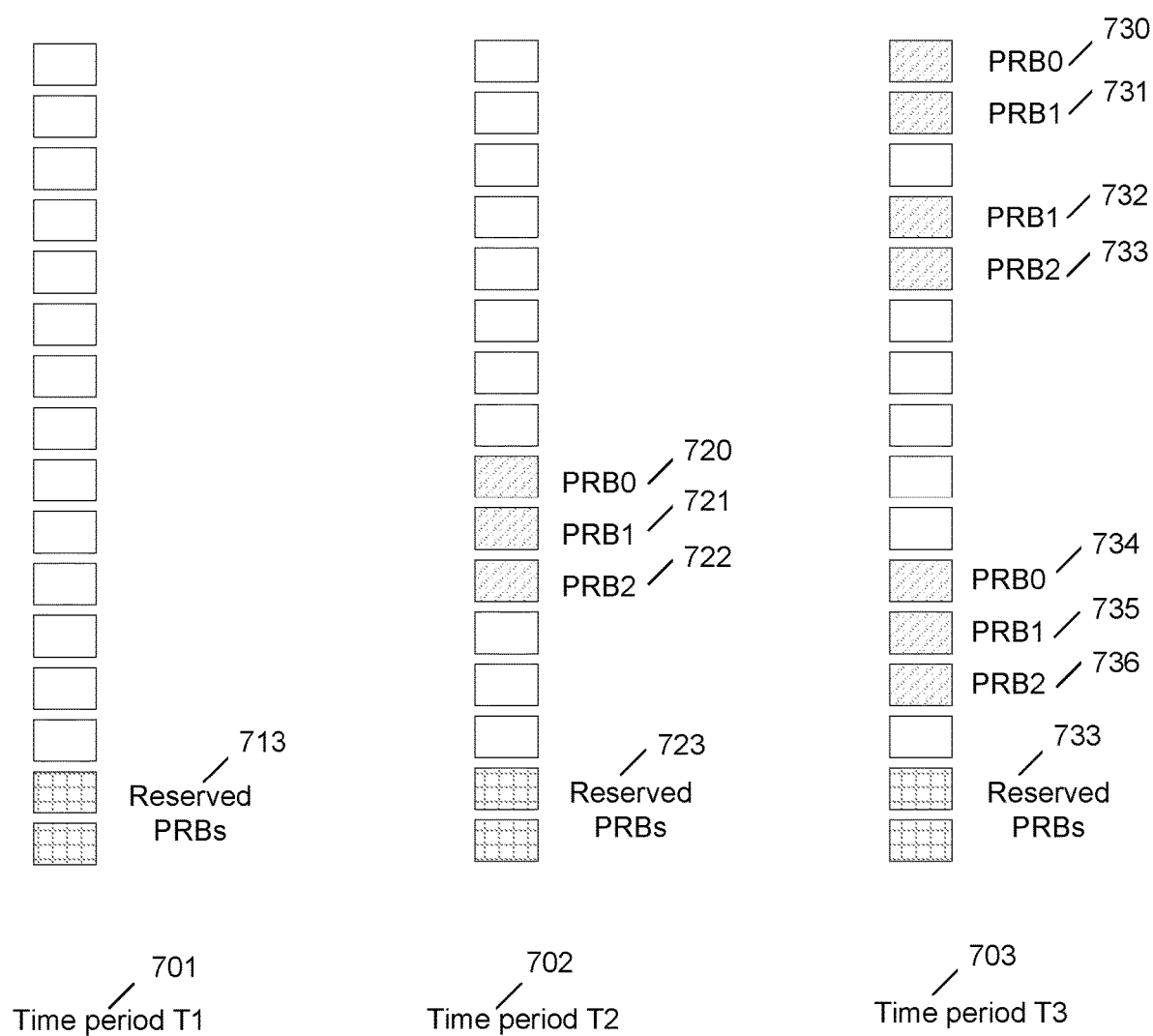
FIG. 7A is a representative diagram showing portions of bandwidth reserved for a UE during a time period, T1.
FIG. 7B is another representative diagram showing other portions of bandwidth reserved for a UE during another time period, T2.
FIG. 7C is another representative diagram showing other portions of bandwidth reserved for a UE during another time period, T3.

FIGS. 7A-7C are a representative block diagram with different number of addressable or addressable PRBs within system bandwidth during different time periods on a UE. There are two reserved PRBs, e.g., 713, 723, and 733 in FIGS. 7A-7C.

FIG. 7A is a representative diagram showing portions of bandwidth reserved for a UE during a time period, T1 (e.g., 701). In this embodiment, FIG. 7A examples that a UE may be identified in an activity state A and there are no addressable PRBs during the time period, T1.

FIG. 7B is another representative diagram showing other portions of bandwidth reserved for a UE during another time period, T2 (e.g., 702). In some embodiment, FIG. 7B illustrates that a UE may be identified in an activity state B and may be configured to transit from the activity state A to the activity state B. In the activity state B, there are three addressable PRBs (e.g., 720-722) that a UE is configured to decode the three PRBs during the time period, T2 (e.g., 702).

FIG. 7C is another representative diagram showing other portions of bandwidth reserved for a UE during another time period, T3 (e.g., 703). In some embodiment, FIG. 7C illustrates that a UE may be identified in an activity state C and may be configured to transit from the activity state B to the activity state C. In the activity state C, there are seven addressable PRBs (e.g., 730-736) that a UE is configured to decode the seven PRBs during the time period, T3 (e.g., 703).

Transition Between States for Data Channel Configuration

In another embodiment of transition between states for data channel configuration, the power savings mode at a UE may be based on the transitions by a UE between the different states, associated with (e.g., each associated with) a specific data bandwidth configuration. A UE may be configured to transition between the data bandwidth configuration states based on certain triggers.

A UE may further evaluate such triggers periodically, such as at every TTI, at every N subframes, or with some configured periodicity. The time period for evaluation may also be defined as a number of subframes in the past starting from the current subframe and such evaluation may be performed by UE continuously every subframe, or on distinctly configured subframes.

Such transitions between states may be based on one or more, or a combination of the following triggers:

1) Scheduling Intensity

A UE may be configured to move between one data channel configuration and another based on the amount of resources scheduled by the network. The rules for transition between one control channel configuration and another control channel configuration may be based on: the rules for transition may be based on the amount of resources scheduled over a recent period of time T.

For example, a UE receives a resource assignment with size larger than a certain threshold, or the amount of resources assigned over a defined period of time is larger than a threshold. Such a threshold may also be defined by the number and/or size of data region that is currently configured in a UE. For instance, the threshold of resources assigned to move from x1 resource blocks to x2 resource blocks will increase as the amount x2 increases.

For another example, if a UE is scheduled with a total amount of resources which exceeds/is below a specific threshold, the UE may be configured to reconfigure its data channel to increase/reduce the number of PRBs.

A UE may be configured to move between one data channel configuration and another if the UE receives a single resource assignment (UL or DL). For example, a UE may be configured to be initially operating over a single minimalistic number of PRBs, and may be configured to move to an operation with a larger number of PRBs in its data configuration immediately following reception of a resource assignment.

A UE may be configured to move between one data channel configuration and another based on the amount of scheduling on the control channel. The triggers may be the same or similar to those described herein that relate to control channel scheduling.

A UE may be configured to move between one data channel configuration and another based on combination of rules given above. For example, the number of assignments (e.g., with resource size larger than a first threshold) received by a UE over a specific time period exceeds a second threshold.

2) Quality of One or a Specific Set of PRBs

A UE may be configured to move between one data channel configuration and another based on measurements made by the UE one the same or other PRBs. For example, a UE may be configured to move from one data channel configuration to another data channel configuration in the case the measured or reported measurements associated with a specific PRB is above/below a threshold (e.g., in order to add/remove the PRB from the list of configured PRBs).

A UE may be configured to move between one data channel configuration and another based HARQ processing results associated with transmissions on one or a set of PRBs. For example, a UE may be configured to increase/decrease the amount of PRBs in its configuration, or may be configured to increase/decrease its system bandwidth based on the HARQ success rate on one or a set of PRBs.

For another example, a UE may be configured to remove a specific PRB or set of PRBs from its configuration if the number of HARQ failures associated with transmissions of transport blocks on that specific PRB or set of PRBs exceeds a specific failure rate.

3) RLC/PDCP/Upper L2 Error Rate, Retransmission Rate, and/or Discards

A UE may be configured to move between one data channel configuration and another based on the overall upper L2 error rate or retransmission rate over a configurable time period. For example, a number of consecutive RLC/PDCP retransmissions, or a set of errors exceeding a specific threshold may result in a configuration change to increase the overall number of PRBs.

A UE may be further configured to trigger such a change (increase or decrease) based on the reception, for example, of a status report at the associated layer (e.g., RLC or PDCP).

A UE may configured to move between one data channel configuration and another based on the detection of a discard (e.g., PDCP discard) of a PDU, and/or based on a period of time without any discard.

4) Trigger of Time

A UE may be configured to transition between states at a specific time instant (e.g., at a specific subframe, and/or frame number) which may be known by the UE, or may be configured by the network. For example, a UE may be configured to always transition between one mode and another periodically at a specific frame/subframe number. As another example, a UE may be configured to operate in one mode for a period of time (based on a timer) and transition to another mode at expiry of the timer.

5) Request by the UE

A UE may configured to request to move between states by issuing a request using SR, BSR, MAC CE, or RRC message.

A UE may configured to trigger a request to move between two states as a result of at least one of the followings:

initiation or termination of a new service at a UE. For example, a UE with an active eMTC service operating in low-power mode may request to move out of low-power mode upon initiation of an eMBB service;

arrival of data associated with a specific service, logical channel, or flow;

determination, by a UE, that data to be transmitted is time critical, or may not meet time requirements without moving out of low-power mode;

the buffer status of one or more logical channels or flows at a UE exceeds a certain threshold;

the time criticality (e.g., Time to live) of data in UE buffer, or transmissions ongoing at a UE goes below a threshold (e.g., a UE has completed transmission of any or most of the time critical data in its buffers); and upon the reception, at a UE, of a packet with high priority or low latency requirements.

A UE may also be configured to implicitly indicate its request to move between states by sending information in the SR, BSR, MAC CE, or RRC message.

For instance, a UE may assume that sending a BSR with information that the buffer status or timing requirements for data in a specific logical channel are above a threshold will result in a change in the data channel configuration.

A UE may also be configured to determine such rules on a per logical channel basis. For example, a UE may be configured to increase the number of data blocks applicable to a specific category of logical channel based on having a BSR where the total buffer statuses for those logical channels exceeds a threshold.

6) Presence or Absence of Reference Signal

A UE may be configured to determine that the UE should change its data bandwidth configuration a result of the presence or absence of reference signals in a specific PRB or set of PRBs. For instance, the operating band may be divided into several subbands where a set of reference signals may be transmitted in that subband. If a UE detects that the reference signal power in a specific subband is below a threshold, the UE may be configured to change its data channel configuration accordingly.

7) Explicit Indication by the eNode-B

A UE may be configured to move between data channel configurations based on explicit indication by the eNode-B (RRC, MAC CE, or signaling in the control channel).

For example, such messaging by the network may include the new data channel configuration and may potentially be signaled using an index to the detailed control channel configuration.

For another example, a UE may be configured to receive the data channel configuration (e.g., required data channel configuration) in the control channel itself either explicitly (using an index) or implicitly (based on the DCI format detected by the UE).

8) Movement between UE States or During Mobility Events

A UE may be configured to move between data channel configurations at distinct UE state transitions and/or mobility events, such as, but not limited to:

following a handover, or UE autonomous mobility event;
in moving from one TRP to another TRP; and/or
upon initiating a connection to the network, such as moving to RRC Connected, or moving between Lightly Connected and RRC Connected states.

Timing for transition between states for data channel configuration

In another embodiment of timing for transition between states for data channel configuration, a UE may further be configured to change the data channel configuration at specific time instances or boundaries. Such boundaries may be defined in terms of frame or subframe numbers, such as (frame number mod x=y). The parameters for such boundaries may defined statically for a specific UE, e.g., based on a UE identifier, or may be signaled by the network. A UE may be further configured to determine the triggers for increase/decrease in the number of data blocks being utilized at these specific time boundaries, and may perform any associated computations for the conditions for the increase/decrease based in information since the last boundary.

In one example embodiment of data bandwidth configuration, a UE may be configured to operate over a subset of data blocks, where a data block (e.g., each data block) may contain and/or include a number of resource blocks which can be allocated to the UE. A data block may potentially be fully self-sufficient, in that the data block may consist of and/or include a distinct control channel which scheduled data resources over that data block. Alternatively, a separate control channel may be assumed for the set of data blocks configured. For instance, the system bandwidth may be divided into a number of data blocks which are non-overlapping and which cover the entire system bandwidth (e.g., a system with bandwidth 80 MHz may be divided into 8 distinct data blocks of 10 MHz each). A UE may further be configured to utilize a subset (e.g., only a subset) of the system's data blocks, whether contiguous and/or non-contiguous, and, for example for a finite period of time.

A data block may further be associated with the use of a specific type of service or logical channel, or set of services/logical channels. A UE may assume and/or determine that the UE may use a specific data block if (e.g., only if) the UE has been configured with the specific service(s).

A UE may be further configured to determine the amount of data blocks the UE is configured to use at periodic opportunities and/or time instances which may be configured by the network. During a UE's power savings mode, a UE may be configured to determine its data block configuration from one of an indexed set of data block configurations provided by the network. At periodic opportunities (e.g., some or each of the periodic opportunities) defined by period P, a UE may be configured to transmit the desired data block configuration to the network in a MAC CE, such as in the BSR, along with other data related to a buffer status of the UE.

A UE may be configured to determine the data block configuration as follows: based on the set of possible data block configuration, select the configuration where the total number of PRBs for the UE falls in the range thesh1*X<#PRB<thresh 2*X, where thresh1 and thresh 2 may be thresholds configured by the network, and/or X may be the total number of PRBs assigned to the UE over the last n*P periodic opportunities; and/or the UE may be configured to select the set of data block configurations that satisfy the above conditions, as the data block configuration with the best measurements determined by the UE.

In another representative embodiment, a data block of minimalistic size (few resource blocks) may be configured for a UE which is relatively inactive. Such a data block may be common to UEs (e.g., all UEs), or the data block may be specific to one or a few UEs.

A UE may be configured to determine its base data block based on an identity of the UE, which may be assigned by the network or self-assigned by the UE. For example, a UE, based on a UE identity, may be configured to determine the frequency location of its base block. Such a base data block may, for instance, be used by a UE which does not have an active connection with the network and therefore does not have any data channel configuration for active data communication.

In another example embodiment, a UE may be configured to determine the PRBs active in its data configuration using one or a combination of the following methods:

a UE may be configured to move from one PRB configuration to another PRB configuration as a function of the data buffer size reported in the BSR. A UE may be configured to compute the number of PRBs to be activated to a multiple of the total buffer size reported in the BSR, where the multiple may be configured by the UE. A UE may be configured to perform the PRB configuration decision when or each time a BSR is triggered or based on certain specific triggers (e.g., only certain specific triggers) of the BSR.

a UE may, in addition, assume a fixed and predefined data channel configuration (e.g., all PRBs are configured, or a statically defined data channel configuration is used) to occur on specific subframes, which may occur periodically (e.g., for one subframe every N radio frames).

In another example embodiment, a UE may be configured to determine its data bandwidth using one or a combination of the following methods:

a UE may be configured with a starting data bandwidth configuration, which may include the center frequency (e.g., location of the data bandwidth). Such a starting configuration may be initiated as a result of the connection by the UE to the network;

a UE may be configured to increase the data bandwidth by a fixed amount for a configurable time period (e.g., each configurable time period) in which there were no PDCP discards detected. If a PDCP discard is detected during a configurable time period, a UE may be configured to decrease its bandwidth by a fixed amount; and a UE may be further configured to decrease its bandwidth to the starting data bandwidth if the amount of data allocated to the UE over the last configurable time period is below a threshold.

In another representative embodiment, a UE may be configured to add or remove a specific number of PRBs from the active set of PRBs, and potentially also modify the UE's active data bandwidth as a result of the creation of a new logical channel Upon initiation of a logical channel, a UE may be configured to add a set of specific PRBs to the active data channel configuration. Such PRBs may be predefined based on configuration for that UE, in that those specific PRBs may be associated with a specific logical channel or logical channel type.

Power Efficient Signaling

Low-Cost Signal

As part of UE power savings mode, a UE can be configured to monitor a low-cost signal which may define the behavior, parameters, and transitions between the UE's activity states.

A UE may be configured to monitor a low-cost signal, which may change the activity state of the UE, change the behavior of the UE within an activity state, provide further information about the parameters to be used in a specific activity state, or a combination of the above. One advantage of such a low-cost signal may be that it may be decoded by the UE in a power-efficient manner.

Examples of Low-Cost Signal

In one embodiment, the low-cost signal may constitute any simplified signaling from the network to a UE, which may use or require a limited, small, or no amount of decoding from a UE side. The low-cost signal may be a signal whose detection or decoding does not use or require a lot of processing at a receiver of the UE. Examples are provided to illustrate possible realizations, but such examples should not limit to other examples of low-cost signal.

In one example, a UE may be configured to monitor a low-cost signal in the time domain, which may enable the UE to detect the presence of the signal without (e.g., the need for and/or use for) performing FFT, decoding, etc. In this case, the low-cost signal may consist of or include a known time domain sequence which can be detected by the UE using correlation followed by energy detection. The time domain sequence may be further transmitted in a specific band or channel of UE's operating bandwidth, and/or the time domain sequence may be transmitted at specific time instances which are known by the UE, this allowing the UE to further reduce power consumption in the monitoring of the low-cost signal.

In another example, the low-cost signal may consist of or include one or more distinct resource elements associated with UE's data or control space. Such a low-cost signal may be UE dedicated, cell specific, TRP specific, or may be associated with a group of UEs.

Another example of a low-cost signal may be a Random Access Channel (RACH) preamble transmitted by the eNode-B.

In some embodiments, a low-cost signal may be a synchronization signal transmitted by the network, such as a special form of Primary Synchronization Signal (PSS) and/or Secondary Synchronization Signal (SSS) and/or Synchronization Signal block (SS-block).

Depending on its form, one advantage of a low-cost signal may be that UE, while monitoring for the low-cost signal, may perform any of the following: turning off all baseband (frequency domain) processing, and/or performing monitoring of the signal or special sequence using a limited receiver bandwidth. For instance, a UE may be configured to receive the low-cost signal over a defined bandwidth which may be smaller than the overall cell bandwidth or normal UE operational BW.

Possible Behaviors defined by the Low-Cost Signal

A UE, upon detection of the low-cost signal, may be configured to perform one or a combination of the following operations:

1) Turn On/Off Monitoring of One or More Control Channels

Reception of a low-cost signal by a UE may trigger or cancel monitoring one or more control channels in the UE. For example, a UE may be configured to monitor, for a low-cost signal (e.g., potentially only for the low-cost signal), and upon detection of the low-cost signal, a UE may be configured to monitor one or more specific or signaled control channels. In another example, a UE may be configured to, during monitoring for a control channel, detect the presence of a low-cost signal which disables or turns off monitoring of that control channel or other control channels in the UE.

A UE may be further configured to start monitoring of a control channel in the cases where the UE is currently in a particular activity state and the UE receives a low-cost signal. For example, a UE, while having a certain data configuration, may be configured to receive a low-cost signal which indicates the presence of additional UE-specific control information residing in one or more of the PRBs, or in a set of CCEs residing in the data bandwidth currently configured.

2) Transition between Activity States in a UE

Reception of the low-cost signal may cause the transition of a UE from one activity state to another. For example, a UE may be configured to receive a low-cost signal which causes a change from one control channel monitoring state to another. For another example, a UE may be configured to receive a low-cost signal which causes a change from one data channel configuration to another.

3) Change the Configuration of an Activity State

A UE may be configured to receive a low-cost signal which modifies the trigger conditions, enables a trigger, or disables a trigger for moving between states. For example, the low-cost signal may cause the change of the scheduling-based triggers to move from one data channel configuration to another in a UE.

4) Trigger a UE to update or read its activity state configuration from another signal. For example, a UE may be configured to receive a low-cost signal indicating that the activity state information has changed, and the UE should read such information from the system information.

Configuration Aspects related to Low-Cost Signal

In some embodiments of configuration aspects related to low-cost signal, a UE may be configured with certain parameters related to decoding the low-cost signal. Such configuration may be received or determined via any or a combination of:

System information;

Fixed, and based on system signature for a cell; and

Fixed, and based on a specific UE ID, UE group ID, or cell ID.

A UE may further be configured to monitor a low-cost signal in one or more specific activity states (e.g., only the low-cost signal in one or more specific activity states), for example, if such a low-cost signal will be used to trigger transition out of that state.

A UE may further be configured to monitor a low-cost signal in a subset of UE states (e.g., only the low-cost signal in a subset of UE states), such as IDLE, CONNECTED, a light connected state, and/or a deep sleep (deep IDLE) state, which characterize the different interactions with the network in terms of whether data can be transmitted, how much, and how.

A UE may further be configured to monitor a low-cost signal upon activation of one or a specific type of service, logical channel, or similar feature.

In some embodiments, configuration parameters may include at least one of a resource in time and/or frequency where the low-cost signal may be decoded or detected, a property (such as an index) used for generating a sequence, and signal characteristics as described in the following. For example, a UE may be assigned at least one identifier (or group ID) and monitor a low-cost signal in a specific resource (e.g., a set of physical resource blocks in certain time symbols) associated with an identifier (e.g., each such identifier). The UE may determine an activity state as the one corresponding to the highest activity level among the activity states indicated by at least one low-cost signal associated with the identifier (e.g., each identifier).

Information Provided by Low-Cost Sequence

The low-cost sequence may provide additional information to a UE through the use of its signal characteristics, such as any or a combination of the following:

the duration of the sequence;

the timing of the sequence (e.g., which subframe or frame the sequence was transmitted in);

the specific sequence transmitted in the case where a UE is configured to monitor multiple sequences;

the time-domain properties of the sequence (e.g., ZC sequences);

frequency band or subband over which the sequence is transmitted;

the beam over which the sequence is transmitted;

as part of a payload decoded in the low-cost signal;

the resources occupied by the sequence in frequency, time or both; and a subcarrier spacing used for the sequence.

A UE may be configured to determine at least any one of the following information from determination of the characteristics of the low-cost signal:

the current DL timing of the cell, e.g., including any of frame number, subframe offset, start of a scheduling period for D2D, start of sensing period for LBT;

the time instance in which a UE should transition between activity states, or the length of time in which the UE should remain in a particular activity state;

the specific band, subband, or channel on which a UE should wakeup, monitor control channel, operate its data channel, etc. For example, the sequence may, for example signal a UE to wake up on one specific subband or channel (e.g., only one specific subband or channel) to receive further scheduling instructions;

the specific beam or set of beams on which the UE may receive control channel from;

configuration aspects related to an activity state in a UE. This may consist of or include properties of the decoding to use on a control or data channel, which could include: specific set of control channel messages or search spaces which could be used to address a UE immediately following deep sleep; specific resources or resource elements to be used initially when addressing a UE; beam angle, beam width, or beam sweeping period used for beamforming; and decoding algorithm (convolutional, block, etc.); and UEs or set of UEs expected to be addressable in the case D2D communication should be and/or is to be performed.

In one embodiment, a UE may be configured with a number of low-cost signals to monitor. A sequence (e.g., each sequence) may be associated with a bandwidth for which a UE should may or is to wakeup to operate on upon detection of that sequence, in addition to the set of control messages and/or search spaces that the UE should use for decoding the control channel following detection of the low-cost signal. Once the UE has successfully decoded an initial message on the control channel using the parameters indicated by the specific low-cost sequence used during the wakeup, then the UE may be configured to automatically revert to using to entire bandwidth, set of control messages, or search spaces. The transition from one bandwidth to another bandwidth may be made using the mechanisms specified herein, for example in the Control Channel Decoding Complexity section.

In another embodiment, a UE in a sleep mode (e.g., a deep sleep) may be configured to monitor for the low-cost signal on a continual basis. Alternatively, in order to ensure further power savings, a UE may be configured to monitor for the low-cost signal during specific time intervals and/or time windows (e.g., only during specific time intervals or time windows) which may be configured by the network. A UE, upon detection of any of the signals for which the UE is monitoring, may be configured to transition to an active state. The time in which a UE needs to and/or is to wakeup may be:

immediately following the detection of the low-cost signal;

a fixed or network configured offset of time following detection of the low-cost signal;

the next frame/subframe following detection of the wakeup signal which satisfies certain criteria, such as subframe (mod) N=k, where k may be determined based on UE ID, cell ID, system signature, or the like; and/or signal duration, specific sequence, or time domain properties of the sequence. For example, a UE may be configured to monitor for multiple sequences, where each sequence represents a different time.

A UE may be configured to decode the control channel during a defined time period, or during N potential instances of the control channel following detection of the low-cost signal. If a UE does not receive any messages within this specified time period following detection of the low-cost signal, the UE may be configured to continue/revert to operate in the low-power state. On the other hand, a UE, once a message is successfully decoded on the control channel, may be configured to move to the active state.

A UE may be configured to transition between the active state to the low-power state (decoding of low-cost signal to wakeup) based on any of the following:

a dedicated message indicating the transition set to a UE (such as via a MAC CE, or PHY-layer control signal);

a UE, at transition between low-power to active state, or at any time during the active state, may be configured to receive an indication to remain in the active state. The UE, upon receiving the indication, may be configured to remain in the active state for the duration of a timer. Then the UE may be configured to transition to the low-power state in the case the indication is not received for the specified time period. The indication which resets the timer may be further piggybacked onto an UL and/or DL grant, or other control information sent to the UE (e.g., timing advance);

a UE may be configured to transition from the active state to the low-power state based on decoding of the low-cost signal itself, namely—Failure to decode the low-cost signal for a specified period of time may cause a UE to transition.

Alternatively, reception of a (potentially different) low-cost signal may force a UE to transition to the low-power state; and following a number of DRX cycles or similar whereby a UE was not scheduled with data on downlink or on uplink.

In another embodiment, a UE may be configured with DRX operation or IDLE-like operation (periodic monitoring of control channel) and be configured to monitor the low-cost signal during the non-active periods between wakeup times (e.g., when a UE is not monitoring the control channel) In this case, detection of the low-cost signal may result in any of the following behaviors for the UE: shifting of the active time of the DRX cycle so that the UE starts at the detection of the low-cost signal, resetting of the drx-InactiveTimer for the DRX operation; and cancelling or disabling DRX operation for the UE.

FIG. 8 is a representative flow diagram illustrating a method for power saving by determining and processing a minimum amount of resources based on a processing state of a UE. The method may be performed by any of devices or systems although it is illustrated that the method is performed by a UE or a WTRU.

The UE may comprise a transmitter, a receiver, and a processor coupled to the transmitter and the receiver. The UE may be configured to determine a processing state that pertains to behavior of the UE at operation 801. A processing state may comprise one or more states that pertain to behavior of a UE. The processing state may indicate activity state of the UE. The UE may determine the processing state based on scheduling activity. The scheduling activity may comprise one or more scheduling events based on any of: (1) reception of dynamic scheduling information as part of downlink control information (DCI), (2) semi-statically configured scheduling information, (3) autonomous transmissions of the WTRU, (4) new data becoming available for transmissions, or (5) a change in rate of the one or more scheduling events (e.g., may be reaching a specific threshold). The UE may determine the processing state using a timer-based function. Determining the processing state based on the timer-based function may comprise establishing any of: (1) a certain amount of time that has lapsed after a last scheduling activity or after a last scheduling event, or (2) a time-based pattern, as an established outcome. The UE may further process at least the determined minimum amount of resources of the one or more sets of physical resources. The processing state may be a function of a wakeup signal or reception of the wakeup signal that is used to determine a change in processing on the UE. The processing state may, but not limited to, relate to the UE actions in at least one of: (1) control channel processing, (2) spectrum bandwidth processing, (3) beam management and processing, (4) reference signal processing, (5) Hybrid Automatic Repeat reQuest (HARQ) timing operations, (6) framing operations, (7) timing operations, or (8) logical channel properties and configuration.

The processing state may determine that the UE is in a first processing state. The UE may determine to transition from the first processing state to a second processing state based on at least one condition. The at least one condition may include reception of a message from a network entity such that the message may indicate at least one of an index associated with the second processing state to be configured, a predefined time at which to transition to the second processing state, and/or a time difference between a time at which the message is received and a time at which the transition associated with the second processing state is to occur. The message may further include a configuration which is used by the UE to further define behavior or actions to be performed in the second processing state (e.g., on the control channel, data channel, and/or other aspects disclosed previously). The at least one condition may include reception of a message from a network entity such that the message may be signaled via at least one of: (1) a Radio Resource Control (RRC) message, (2) a Medium Access Control (MAC) Control Element (CE), (3) downlink control information (DCI) on a control channel, or (4) a wakeup signal. The at least one condition may be based on at least one of: expiry of a timer, a change in scheduling activity on the control channel, arrival of a new service at the WTRU, availability for transmission, successful transmission/reception of data at the WTRU, data in the WTRU buffers exceeding a threshold or below a threshold, expiry of a timer related to an activity state or a scheduling activity, speed of the WTRU exceeding or below a certain value, battery life reaching a specific value, triggering a scheduling request, initiation of a scheduling request; and execution of an access procedure, a state of a Hybrid Automatic Repeat reQuest (HARQ) process, presence or absence of a signal, such as a reference signal, change of one or more monitored beams, a beam switch/change, and/or a beam management event (e.g., beam failure). The UE may send a request message to a network, the request message indicating a change of the first processing state. The request message may further comprise at least one of: a state index of a target state to which the WTRU attempts to transition, a list of desired states indices, one or more parameters associated with the condition for a state transition, buffer occupancy, a specific logical channel, a type of data, channel measurements, or a time duration in the target state.

The UE may associate the first processing state with a first configuration for a data channel, and associate the second processing state with a second, different configuration for the data channel. The UE may receive a resource assignment for the second processing state from a network entity, transition to the second processing state, and decode the received resource assignment in the second processing state.

At operation 802, the UE may determine a minimum amount of resources to be processed for one or more sets of physical resources based on the determined processing state. Each respective set of physical resources may comprise resources in time, and any of frequency or space. For each respective set of physical resources, the time may correspond to a frame structure associated with a numerology applicable to the respective set of physical resources. The frequency may correspond to any of a frequency location (e.g., a center frequency), a bandwidth, or the numerology, which may further correspond to a bandwidth part of the carrier. The space may correspond to one or more beams.

The UE may monitor a control channel using any of: (1) at least the determined minimum amount of resources of the one or more sets of physical resources or (2) a type of signaling structure. The determined minimum amount of resources of the one or more sets of the physical resources may comprise one or more control channel elements and one or more aggregation levels. The type of signaling structure may comprise (1) reception intensity of signals including downlink control information (DCI) and (2) a size, format, and/or type of each received signal including the DCI. The reception intensity of signals may comprise the reception intensity of any of: a reported radio link quality, a type of a configured service, or an activity observed for a given service. At operation 803, the UE may process the determined minimum amount of resources of the one of more sets of physical resources.

Power Savings under Multiple SOMs

A UE may be configured with multiple SOMs, spectrum blocks, bandwidth parts, numerologies and/or control channels (or equivalent structure) such as using different sets of DCIs, etc. A UE may be configured to operate with more than one SOM in a TDM manner, in an FDM manner, or a combination of the two. A SOM (e.g., each SOM) may be associated with a control channel that carries information for allocating a set of spectrum blocks for a UE. Resources may be allocated on that specific SOM and/or spectrum blocks.

1) TDM

In one embodiment, in a TDM case, a UE may be configured to have periods when scheduling opportunities for allocating resources may occur every first duration (e.g., 1 ms) that alternates with periods when scheduling opportunities for allocating resources occur every second duration (e.g., 125 µs).

2) FDM

In one embodiment, in an FDM case, a UE may be configured with spectrum blocks where scheduling opportunities for allocating resources may occur every first duration (e.g., 1 ms) and other spectrum blocks where scheduling opportunities for allocating resources occur every second duration (e.g., 125 µs).

3) Combination of TDM and FDM

In one embodiment, in case of a combination of TDM and FDM, a UE may be configured with periods when scheduling opportunities for allocating resources may occur per TDM as described above and other periods when scheduling opportunities for allocating resources may occur per FDM as described above.

A UE may be configured to monitor a control channel according to a time-based algorithm. One embodiment may include a legacy LTE DRX procedure. Another embodiment may include any of the methods and procedures described herein. Such time based-algorithm may be represented by timers and/or counters. In such case, a UE may be configured to determine an activity time, which consists of a time for which the UE is minimally required or used to monitor a control channel. Then, a UE may be configured to sleep (e.g., by reconfiguring its radio front end) and/or to perform DRX (e.g., to discontinuously monitor one or more control channels) for all other time instances in which the UE is not required or used to monitor the control channel.

Such a time-based control channel monitoring algorithm may be applied in conjunction with other methods described herein, either distinctly in a configurable fashion, or in combination.

General Principles

A UE may be configured to determine different levels of power savings over time, using an approach based on the legacy DRX and/or using methods such as described herein. A UE may be configured to perform different power savings modes at different times and/or in connection with different SOMs. The UE configured with a plurality of numerologies, a plurality of spectrum blocks (or SOMs) and/or with a plurality of control channels (e.g., one for each numerology, spectrum block or set thereof) may be configured to perform such determination using timing references and relationships. The timing reference and relationship may correspond to a clock, to a time-based trigger to modify (e.g., decrement/increment by 1 unit) one or more timers and/or to any counting approach used to manage time-related aspects of such algorithm (hereafter referred to as "clock"). Typically, a set of one or more timers is used for a given instance of a power savings mode such as the legacy LTE DRX. Clocking may be based on TTI duration, shortest time between two scheduling opportunities, or other framing aspects. A clock thus typically refers to a downlink timing aspect.

1) Parametrization of the Legacy LTE DRX Algorithm

In one embodiment, legacy timers and related parameters that control legacy LTE DRX operation include onDuration-Timer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined. The timer (e.g., each timer) may be clocked based on the LTE subframe in which reception of downlink control signaling is possible (e.g., a 1 ms PDCCH-subframe).

2) Method A—At Least Some Timing Aspects are Clocked Based on a Reference Numerology In one embodiment, a UE may be configured to control some timing aspects of a power savings function as a function of frame duration associated with a given numerology and/or as a function of scheduling opportunities/occasions (hereafter more generally referred to as clock/timing) associated with a SOM. This behavior may be a default behavior of the UE's configuration.

3) Method B—At Least Some Timing Aspects are Clocked Based on a Reference Numerology In another embodiment, a UE may be configured to control at least a first set of timing aspects as a function of the timing associated with a reference numerology/SOM/spectrum block. Such reference numerology may be a configuration aspect of a UE (e.g., by Layer 3/RRC configuration, UE-dedicated or "cell/spectrum"-specific received by dedicated signaling or broadcasted), or it may correspond to a default numerology of a cell and/or spectrum block, such as the one associated with the resources used by a UE to first access the system (e.g., 1 ms) and/or the one indicated in system information. In some embodiments, such first set of timing aspects may correspond to periods configured for a UE to be reachable after a period of inactivity (e.g., the On-Duration period parametrized by onDurationTimer, drxStartOffset, the longDRX-Cycle and optionally the drxShortCycleTimer and shortDRX-Cycle for the legacy DRX). This behavior may be a default behavior of the UE's configuration.

4) Method C—At Least Some Timing Aspects are Clocked Based on a Reference Numerology In another embodiment, the UE may be configured to control at least a second set of timing aspects as a function of the timing associated with a specific numerology/SOM/spectrum block. Such may correspond to a specific control channel, TTI duration and/or may differ from another based on UE's configuration. In some embodiments, such second set of timing aspects may correspond to periods that are dynamically controlled by the network and/or that are related to a UE's transmission activity (e.g., the Active Time outside of the On-Duration period as parametrized by drx-InactivityTimer, drx-RetransmissionTimer and HARQ RTT timer for the legacy DRX). This behavior may be a default behavior of the UE's configuration.

5) Combination of Methods A/B/C

In some embodiments, a UE may be configured to control one or more power saving aspects (e.g., control channel monitoring, bandwidth adaptation, beam management etc.) using a combination of the above methods. In a representative embodiment, a UE may be configured to control blind decoding activity for all control channels using the timing/clock of the reference numerology for the "reachability" period, e.g., the On-Duration period (and its associated parametrization), while using that of the numerology for which a UE is scheduled for other aspects when the UE becomes active in transmissions for the applicable control channel(s) such as the channel on which the UE is actively receiving downlink control signaling.

6) Method—Representative Realization for FDM

The above-embodiment is particularly applicable to cases where resources associated with different numerologies are configured in FDM manner. In one embodiment, some timers related to the On-Duration (and start offset) may be a function of a default TTI duration and/or scheduling opportunity (e.g., 1 ms) while other timers (Inactivity Timer, HARQ-related timers, long/short cycle DRX, etc.) may be a function of a numerology associated with a UE's transmission activity when scheduled (e.g., 125 μs if scheduled with a second numerology, 1 ms otherwise). In addition, all (or each) control channels associated with a given numerology may have a set of timers following timing aspects associated with that numerology (e.g., 1 ms clock vs 125 μs clock, and timer starting values). In another embodiment, there may be a set of timers common for all control channels independent of numerology for, e.g., On-Duration as well as for common start offsets.

7) Method—Representative Realization for TDM

In one embodiment, a UE configured with different numerologies/SOM/spectrum blocks using TDM may be configured to control one or more power saving aspects (e.g., control channel monitoring, bandwidth adaptation, beam management, etc.) using (numerology/SOM/spectrum block)-specific DRX instances. In such cases, for periods where no resources of a numerology/SOM/spectrum block are applicable (e.g., no associated physical control channel may be available and/or no corresponding physical data channel can be scheduled), the associated DRX instance may simply halt and wait. Otherwise, the associated DRX instance may clock according to the timing applicable to the concerned numerology/SOM/spectrum block.

In another embodiment, a clock may be a function of scheduling opportunities independently of the TTI/frame duration of the respective numerologies/SOM/spectrum blocks. In such case, a single DRX instance may be used.

UE-Specific DRX

A UE may be configured to have a single power savings mode (e.g., including a control channel monitoring algorithm such as legacy DRX) applied across all SOMs. For example, a UE may be configured to monitor a control channel in different SOMs, and may be configured to have its control channel monitoring algorithm common across all SOMs.

In such case, A UE may be configured to apply a UE's DRX across all SOMs or control channels (CCs) associated with such SOMs. Since a SOM (e.g., each SOM) may have different timing of the control channel (e.g., how often the UE may receive scheduling), methods for determining a UE's control channel monitoring behavior under a time-based algorithm are required and/or used and described below.

1) A UE Operating in One Numerology by Defining its DRX Behavior from the Timing of a Default SOM In one embodiment, a UE may be configured to determine its periods of control channel monitoring, and periods of allowable DRX based on a number of control channel scheduling opportunities of a specific numerology or specific SOM, which can be configured by a network. The UE may or may not be monitoring a control channel on such a default SOM when the UE is configured to perform DRX based on the timing of a default SOM.

In another embodiment, a UE may be configured to perform DRX based on counting of subframes in a default numerology. The UE may further be configured to monitor a control channel in a numerology other than the default numerology. The UE may be required and/or used to monitor a control channel for an on duration period of x subframes in the default numerology before the UE can perform DRX. Depending on the numerology or SOM configured at the UE, the number of slots or control channel scheduling occasions may vary during this on duration period.

A UE may be configured to start one or more timers during the on-duration such that the UE is required and/or used to monitor the control channel for a period of the one or more timers which are longer than the on duration period. Such timers may be clocked based on the default numerology. For instance, a UE, while monitoring the control channel in its configured numerology, may be configured to receive DL or UL grants which start an inactivity timer. The UE may be configured to increment such inactivity timer based on the timing of the default numerology (e.g., once for a subframe (e.g., each subframe) in the default numerology). A UE may be configured to determine that the UE can perform DRX (e.g., the UE does not monitor or does not need to monitor the control channel) upon the expiry of any timer started during the on duration period.

A UE may be configured to start monitoring a control channel during a specific subframe in the default numerology, where such subframe may occur periodically according to some configured period. The UE may further be configured to compute the slot or control channel opportunity as:

the first control channel opportunity in the configured SOM which occurs following the start of the subframe in the default numerology; or the control channel opportunity which occurs closest in time (before or after) the start of the subframe in the default numerology.

2) DRX Timing Defined Based on Scheduling Occasions

In one embodiment, a UE may be configured to determine its periods of control channel monitoring, and base its timers on the total number of scheduling occasions in the configured numerology. For example, the UE may be configured with an on duration, as well as a set of timers for which the UE may be configured to remain active following the on duration, which are defined based on the number of scheduling occasions for the UE in its configured SOM.

A UE configured with multiple SOMs may be configured to determine the number of scheduling occasions based on the total number of scheduling occasions in the configured SOMs (e.g., each of the configured SOMs).

3) Combining the Timing of Different SOMs to Derive Single DRX Behavior

In one embodiment, a UE may be configured to combine the timing of its different configured SOMs as well as non-configured SOMs such as a default numerology in order to define overall DRX behavior. For example, the timing of one or more DRX parameter or DRX-related timer may be controlled by a first numerology or SOM, whereas the timing of one or a different set of DRX parameters or DRX-related timers may be controlled by a second numerology. The selection of SOM and/or the selection of timers that are calculated by the associated SOM may be determined by one of the followings:

network configuration: in an embodiment, if a UE is configured with multiple SOMs, a UE may be configured by a network with the SOM timing to use to determine the associated timers (e.g., each of the associated timers); and logical channel configuration: in an embodiment, a UE may be configured to determine the SOMs to use based on priority or latency requirements of the logical channels which may mapped to a SOM (e.g., each SOM), such as by using the logical channel with the highest/lowest priority.

In another embodiment, a UE may be configured to determine its DRX cycle and/or its on duration period using a first numerology or SOM. Such first numerology may be a default numerology or SOM. In other words, a UE may be configured to determine the on duration and wakeup times (e.g., DRX cycle length) based on a number of subframes in the default numerology. The UE may further be configured to use the timing of its configured numerology to increment the timers associated with maintaining the UE's activity time, such as any of the inactivityTimer, retransmissionTimer, ULRetransmissionTimer, shortCycleTimer, etc. In some embodiments when a UE is configured with multiple non-default SOMs, the UE may be configured to determine the non-default SOM for which the above timers are calculated to be the SOM to which the highest priority logical channels have been mapped at any given time.

4) Definition of DRX Behavior as a Function of Multiple DRX-Related Timers for Different SOMs In one embodiment, a UE may be configured to maintain different DRX-related timers, such as different instances of any of the InactivityTimer, retransmissionTimer, ULRetransmissionTimer, shortCycleTimer, etc. For instance, values of such timers may be configured differently. A UE may be configured to determine whether to continue monitoring its control channel based on a function or relation of one or more of these timers in addition to properties of the SOM itself, such as, but not limited to:

logical channels mapped to the SOM (e.g., each SOM): for example, selection (e.g., of a control channel) based on presence of specific logical channels mapped to an SOM;

network configured inclusion/exclusion of certain SOMs in the function: for example, the mapping rules may be mapped based on a function of certain SOMs (e.g., only the function of certain SOMs), and the list of SOMs to be considered may be statically and/or dynamically changed by a network at any time through network signaling;

QoS properties of the association SOM, or logical channels mapped to the SOM: for example, the rules may be based on the highest priority logical channel mapped to the SOM at any given time, or an SOM with priority higher than a certain threshold;

number of services, logical channels, or the like, mapped to the SOM (e.g., each SOM): for example, the rules may be based on having a minimum amount of logical channels mapped to a SOM, or the UE-specific active time may be a weighted combination of the timers associated with the SOM (e.g., each SOM), where the number of logical channels may determine the weight applied; and bandwidth or amount of resources usable for the SOM (e.g., each SOM): for example, the rules may be based on having a minimum amount of bandwidth configured for the SOM, and/or the UE-specific active time may be a weighted combination of the timers associated with the SOM (e.g., each SOM), where the bandwidth may determine the weight applied.

In another embodiment, a UE may be configured to determine its activity time as the time required and/or used for the timers for the SOMs to expire (e.g., each of the SOMs to expire). A UE may be configured to monitor control channel(s) for all SOMs as long as the timers (inactivity Timer, RetransmissionTimer, etc.) for all of the active SOMs are still running.

In another embodiment, a UE may be configured to determine the activity time as the time required and/or used for the timers of one specific SOM to expire, where that SOM may be semi-statically or dynamically configured by a network (e.g., through RRC signaling or control channel signaling) or may be selected based on the SOM having the highest priority logical channel over other logical channels in the absence of any network configuration.

The above embodiments may be applicable for SOMs which are TDM or FDM. In the TDM case, a UE may be configured to determine, in a given scheduling occasion, which SOM is currently being scheduled. Such determination may be made based at least one of the following:

the control channel numerology for a given slot, minislot, or subframe;

a fixed pattern of multiplexing of the different numerologies; and by a structure of SOM multiplexing that is determined via signaling from the network, such as through dynamic signaling from another control channel, or via RRC signaling 5) Selection of Timer Based on Nature of Received Data in an Active Time A UE may be configured to select from one of a set of DRX or DRX timer values based on a type of data multiplexed in the Medium Access Control (MAC) Protocol Data Unit (PDU) or transport block transmitted. A UE may, in a first operation, be configured to determine the nature of the data multiplexed into the received MAC PDU during an active time and make a determination of one or more of the applicable DRX timers based on the type of data. Such determination may be based on one or more of the following properties of the data received in the MAC PDU:

the logical channel or logical channels, or service(s) associated with the MAC PDU;

QoS properties of the data in the MAC PDU, or associated with the logical channels, services, or flows within a logical channel (e.g., each logical channel), such as priority, delay requirements, reliability requirements, rate requirements, or the like; and the number of logical channels or services multiplexed into the MAC PDU.

In one embodiment, a UE may be configured with a set of distinct inactivityTimers for logical channels (e.g., each logical channel) or for logical channel groups (e.g., each logical channel group). A UE may, during the active period, be configured to determine to start the inactiveTimer upon reception of a grant from the network. The UE may be configured to select the inactiveTimer which corresponds to the logical channel group transmitted in the MAC PDU received with the grant. Additionally, if multiple logical channel groups are transmitted within the same MAC PDU, a UE may be configured to select the inactiveTimer associated with one of the logical channel groups (selected based on rules such as network configuration, use of the highest/lowest priority, etc.).

In another embodiment, a UE may be configured to determine a DRX time (e.g., the time for which the UE is not required to monitor a control channel) based on selection of a timer which is specific to a logical channel or logical channel group. The UE may be configured to determine such logical channel or logical channel group for selection of the timer as being the highest/lowest/majority logical channel transmitted in the first/last/majority MAC PDUs received during the active time.

6) UE Monitoring CC Based on Interval of Scheduling Opportunities

In one embodiment, a UE may be configured to monitor a control channel for a specific SOM over a non-contiguous interval of scheduling opportunities. For example, a UE may be configured to monitor a control channel for a specific SOM (or potentially, the UE may be configured to employ a single SOM (e.g., only the single SOM) where the CC opportunities may occur each slot in a specific numerology.

In another embodiment, a UE may be configured in power savings mode to monitor every Nth slot of the control channel, namely, slot 0, N−1, 2*(N−1), etc. The UE may be configured to determine the value of N based on network configuration, or based on dynamic signaling. For example, the UE may be configured to receive an indication via the control channel itself to change the value of N dynamically. In some embodiment, a UE may be configured to determine the value of N from a set of predefined values based on a UE state, where the UE state may represent level of activity and/or power saving state. For example, a UE may be initially configured with a set of values as {2, 4, 8, 16, . . . , M}, where M is an integer power of 2. The UE may be configured to determine the value of N autonomously based on the status of DRX timers. For example, during a highest activity state, a UE may be configured to choose the value of N to be lowest among the predefined set (e.g., 2). During the highest power saving state, the UE may be configured to choose a highest value among the predefined set, e.g., 16. Such configuration of predefined values may allow the UE to be reachable by the network irrespective of their understanding of UE activity state, for example, via the highest value in the predefined set.

The UE may be configured to employ the above method in combination with other methods described herein, or in combination with legacy-like DRX. For example, the UE may be configured to decrement DRX-related timers, such as inactivityTimer, the Nth control channel scheduling opportunity (e.g., only every Nth control channel scheduling opportunity (e.g., based on the UE's own monitoring schedule).

In another embodiment, a UE may be configured to determine certain DRX-related timers based on the control channel scheduling opportunities, and other timers based on its own monitoring opportunities (e.g., every Nth control channel scheduling opportunity).

SOM-Specific DRX

A UE may be configured to apply an independent DRX or control channel monitoring algorithm to a SOM (e.g., each SOM). Within the control channel monitoring algorithm that is specific to a SOM (e.g., each SOM), a UE may further be configured to apply any control channel monitoring function based on methods described herein. A UE may further be configured by the network as to which algorithm to apply to a given SOM. The methods described herein provide further aspects, operations, procedures and functions related to the interaction between the SOM-specific control channel monitoring algorithms.

One advantage of independent DRX may allow a UE to turn off parts of its front-end or digital control channel processing (in the case of FDMed SOMs) based on the expected activity of each SOM independently.

1) Monitoring of Primary Control Channel for SOM Power Saving Configuration

A UE which performs independent DRX on different SOMs may further be configured to monitor a primary control channel associated with a specific SOM (which may or may not be configured for the UE) in order to receive SOM configuration information (e.g., the resource blocks associated with a SOM (e.g., each SOM), the numerology, duration of the numerology block, etc.). Such primary control channel may span a subset of the channel or the entire bandwidth, and may use or require the UE to monitor a default numerology. The UE may be configured to monitor for the primary channel for a finite period of time (e.g., a fixed number of subframes in the reference numerology).

A UE may be configured to receive the configuration of the primary control channel from RRC configuration, from system information, or from an access table, for example for providing system-related information.

2) Reception of On/Off Period Information from the Primary Control Channel

A UE may be configured to perform control channel monitoring or DRX based on the reception of dynamic information provided on the primary control channel Such dynamic information may be used in conjunction with a semi-static or preconfigured configuration used by the UE. For example, the UE may be configured to receive indication of periods for monitoring SOM-specific CCs or configured to receive indication of one or more periods of DRX on a specific SOM based on signaling received from the primary control channel, as at least one of the followings:

DRX time to be applied to a specific SOM: a UE may be configured to receive an indication on the primary control channel to perform DRX (e.g., absence of CC monitoring) on a specific SOM for a period of time, which may be pre-configured or indicated;

indication for continuous control channel monitoring: a UE may be configured to receive an indication on the primary control channel to perform continual monitoring of CC on a specific SOM until further notice from additional signaling on the primary control channel;

active time to be applied to a specific SOM: a UE may be configured to receive an indication on the primary control channel to start monitoring the CC of a specific SOM, and to do so for a specific period of time or active period;

configuration/reconfiguration of DRX timers: a UE may be configured to receive an indication on the primary control channel to reconfigure the timers related to legacy-like DRX to be applied to that specific SOM; and a control channel monitoring algorithm: a UE may be configured to receive an indication on the primary control channel which configures a control channel monitoring algorithm (as per the methods described herein) to be applied to a specific SOM, and the associated parameters for that algorithm.

A UE which receives such information of on and off period for a SOM (e.g., each SOM) from the primary control channel may be configured to monitor the primary control channel (e.g., only the primary control channel) unless indicated to do so by dynamic signaling on the primary control channel.

3) Reception of a Wakeup or DRX Modification from One SOM for Another SOM

In one embodiment, a UE, while operating with independent DRX per SOM, and while monitoring an SOM specific CC based on independent DRX, may be configured to receive a change in DRX configuration of a first SOM from signaling (e.g., PDCCH or similar dynamic signaling) received from a second SOM. Such change in DRX configuration or change in behavior may comprise at least one of the followings:

change in the DRX cycle;

change in any of the DRX related timer values, such as inactivityTime, retransmissionTime, shortDRXCycle, etc.;

change in offset of the DRX cycle (e.g., frame/subframe/ slot index defining the start of the active period); and indication to wakeup or start monitoring the control channel at a predetermined time (e.g., immediately or in x subframes) for a configurable or predefined period of time.

In one embodiment, a UE may be configured to monitor a CC for two different SOMs using independent control channel monitoring algorithms. Such control channel monitoring algorithms may both consist of or include a legacy DRX-like operation, or may be defined based on methods described herein. The first SOM may be associated with low-latency related data transmission, and may consist of or include shorter DRX times compared to a second SOM which may be associated with eMBB. A UE may be configured to receive, from the first SOM, an indication to wakeup immediately to monitor control channel on the second SOM. Such immediate or indicated wakeup may also be associated with a change in the DRX cycle offset so that the active time on the second SOM would start at the indicated time for the UE. In another embodiment, the indication may create a new active time of a configurable duration within the existing DRX cycle. The UE may be configured to receive at least one of the following information from the indication:

the SOM or SOM index on which the UE is to wake up (for SOM2);

the scheduled time for which the UE is to wakeup;

new DRX parameters or timers associated with the reconfiguration, such as the new DRX offset to apply in order to realize the indicated wakeup;

the amount of time for which the UE is configured to monitor the control channel on the SOM in question;

specific control channel elements on which to decode, for example, specific CCEs, or sets of search spaces the UE is configured to receive;

specific DCIs the UE is configured to monitor for while waking up immediately on SOM2;

subinterval of control channel monitoring frequency to apply to SOM2; and indication to turn on/off DRX or a power saving algorithm on SOM2.

In another embodiment, parts or all of the above information may be semi-statically configured in the UE as part of the DRX configuration.

The advantage of such an embodiment may be to increase the reachability of a UE when operating under different SOMs, namely, the UE may become reachable in a second SOM (for example, without the need for the network to wait for the UEs activity time in that SOM), if the UE has control channel activity in a first SOM.

4) Deriving SOM-Specific DRX-Related Parameters from a Default Configuration Based on a Change in Numerology In one embodiment, a UE may be configured with a set of DRX-related parameters, such as, but not limited to, an inactiveTime, drxCycle, retransmissionTimer, shortDRX-Cycle, etc. to be applied for a specific numerology or SOM. A UE may be configured to derive the associated parameters to be used on a different SOM based on a function of the default parameters and one or more scaling relationships which may be at least one function of the followings:

the difference in the numerology between the SOMs (e.g., scaled by the difference in the subcarrier spacing, etc.);

the nature and/or number of logical channels mapped to a specific SOM;

the logical channel identifier (LCID), logical channel group identifier (LCG ID), or priority identifier associated with the logical channel(s) mapped to a specific SOM;

a weighted average of the number of logical channels mapped to a specific SOM, where the weights may be provided by the network; and a network configured scaling factor specific to the numerology, which could be provided by RRC signaling, or dynamically (e.g., provided on the primary control channel).

A UE may further be configured to apply different scaling factors or functions to different DRX parameters.

In one embodiment, a UE may be configured to derive a DRX cycle for a specific SOM by multiplying a default DRX cycle by a scaling factor determined based on the logical channels mapped to that SOM. Such scaling factor may be provided by the network (e.g., the UE may be configured to receive a specific scaling factor associated with a logical channel (e.g., each logical channel)). In a case that multiple logical channels are mapped to the same SOM, the UE may further be configured to perform a weighted average of the scaling factors over the logical channels (e.g., each of the logical channels) mapped to the SOM. The UE may be configured to derive the scaling factor directly from the LCID, LCG ID, or priority parameter/level or similar associated with the logical channel.

DRX Operations Following UL/DL Transmissions-DRX Operation Following Transmission of SR A UE may be configured to perform a DRX-like operation following the transmission of a scheduling request (SR) to the network. For example, such DRX-like operation may be characterized by monitoring the control channel for a number (e.g., a fixed number) of scheduling opportunities (N) every M scheduling opportunities. The value of M (termed the SR-DRX cycle), and the value of N (termed the active period) may be configured by the network.

The UE may be configured to determine the values of either M and/or N based on at least one of the followings:
  direct configuration by the network;
  fixed or preconfigured value (e.g., N=1);
  determined based on the logical channel(s) for which data arrival triggered the SR;
  based on the time-related requirements associated with the arrival of new data that triggered the SR (e.g., time-to-live); and
  based on the SOM used to transmit the SR.

A UE which further determines the values of M and/or N may be configured to provide such determination, or some implicit information related to such determination to the gNB as part of the SR. Such information may be provided explicitly in the SR, or based on some properties associated with transmission of the SR, such as the resource, power, spreading, MA scheme, preamble sequence, or other property associated with SR transmission.

A UE may be configured to continue the above DRX behavior until one or more of the following occur:
  the UE receives a grant associated with the triggered SR;
  a timer expires (which may trigger a new SR);
  the UE is scheduled on another SOM that can satisfy the request; and
  the UE receives an indication from the network to continuously monitor a control channel for grants.

A UE may be configured to retransmit the SR according to the DRX schedule described above (e.g., the UE may be configured to retransmit the SR following control channel monitoring every kth wakeup period of M scheduling opportunities).

In one embodiment, a UE may be configured to determine the value of M based on the logical channel which triggered the SR, and may assume N=1. For example, the UE may be configured (by the network) or preconfigured with a value of M to be used for logical channel and/or logical channel type (e.g., each logical channel or logical channel type). The UE may further be configured to transmit the LCID or similar as part of the SR. Once the SR is transmitted, the UE may be configured to monitor CC every Nth scheduling opportunity in the specific SOM numerology, or in some reference numerology.

Multilevel Activity Control

A UE may be configured to decode downlink control information (e.g., at least one DCI) on a first set of control channel resources (e.g., a common search space, such as a common control channel like PDCCH). Such configuration may include one or more identifiers (or indexing values). Such configuration may include a specific RNTI to use for decoding of such DCI. Such DCI may consist of or include a specific DCI type. Such specific DCI type may carry information such as one or more identifiers (or indices). Such information may be organized as at least one of: one or more fields' values, one or more bitmaps, or similar.

In some embodiments, at least one parameter used for decoding at least one DCI may be a function of an identifier used for activity control, such as a group ID. For example, such parameter may include a RNTI to use for decoding at least one DCI, or a parameter indicating a resource on which to attempt decoding at least one DCI, such as a time symbol, a set of slots or mini-slots, a set of physical resource blocks, resource element groups and/or control channel elements. In an embodiment, in case a UE is configured with more than one identifier, the UE may be configured to attempt to decode a DCI for an identifier (e.g., each such identifier) using the one or more associated parameters.

From a First State (e.g., Lower Activity State) to a Second State (e.g., Higher Activity State)

In an embodiment, a UE may be configured to decode a specific DCI on a common search space. a UE may decode the specific DCI using a specific RNTI. It is contemplated that such decoding activity is a function of an activity state. It is contemplated that such decoding activity corresponds to a first time scale (e.g., slot, subframe or the like). The UE may be configured to determine from a successful decoding of such specific DCI that the DCI includes one or more identifiers (or indices). The UE may be configured to determine that such one or more identifiers (or indices) match one or more configurations of the UE. In representative embodiments, the UE may be configured to determine from such matching (to, e.g., at least one identifier) that it should move to a second activity state. It is contemplated that such activity state corresponds to a second time scale (e.g., mini-slot, slot or the like).

In representative embodiments, the activity state (e.g., each activity state) may be associated with a certain number of blind decoding attempts. For example, a UE may be configured to perform a low number of blind decoding attempts in a low activity state and a high number of blind decoding attempts in a high activity state. Blind decoding is part of control channel processing. The dependency between an activity state and blind decoding is described herein, for example in the above-section of "Reduction in the number of blind decodings."

From Higher Activity State to Lower Activity State

In another embodiment, a UE may be configured to determine, based on received signaling, that a change in an activity state may be performed from a first activity state corresponding to a higher level of activity to a second activity state corresponding to a lower level of activity. Such levels may be in accordance with activity states as described above.

In some embodiment, in case a UE decodes more than one DCI or control signal associated with an identifier of its configuration, the UE may be configured to determine an appropriate activity state based on a pre-determined rule. For example, the UE may select the highest state among indicated activity states.

Network Perspective and Possible Benefits for Scheduling Function

From a network's perspective, one or more UEs may be configured using the same set of control channel resources, search space, specific RNTI, etc. The network may be configured to allocate the same identity to a set of one or more UEs for the purpose of aligning an activity state of such set of UEs. The network may be further configured to allocate one or a plurality of identifiers (or indices) to a given UE to increase flexibility in determining a subset of one or more UEs which share similar scheduling activity over a given period of time.

In some embodiments, such control signaling may correspond to a low-cost signal. It is contemplated to configure one or more properties of either control signaling or the low-cost signal. Such properties may correspond to (e.g., each correspond to) one specific identifier (or index).

Activity levels may be further generalized in arbitrary numbers. For example, the number of activity levels may be realized based on any combination of: a specific DCI, RNTI, set of control resources, low-cost signal characteristic, and specific identifiers (or indices) with a specific level.

In a representative embodiment, a UE may be configured to monitor PDCCH (or common PDCCH) using a specific RNTI in every slot. When the UE successfully decodes a DCI from such PDCCH (or common PDCCH), the UE may be configured to determine if at least one identifier of its configuration matches at least one identifier included in the DCI. If a match is detected, the UE may be configured to determine that blind decoding attempts may be performed, e.g., according to (for example only according to) a low activity state (e.g., no blind decoding at all) for the remainder of the slot (and/or for example, a number of slots determined by higher layers). If no DCI was decoded or no match exists, the UE may be configured to perform blind decoding attempts according to the highest activity state.

In another representative embodiment, the UE may be configured to perform blind decoding attempts according to a high activity state of (e.g., only if) either no DCI was successfully decoded on PDCCH (or a common PDCCH), or a DCI was successfully decoded and a matching identity as per the above exists. Otherwise, the UE may be configured to perform blind decoding attempts according to a low activity state.

In another representative embodiment, the UE may perform blind decoding attempts according to a high activity state if (e.g., only if) a DCI was successfully decoded and a matching identity as per the above exists.

FIG. 9 is a flow diagram illustrating another representative method for power saving. This representative method may be performed by any devices including a Wireless Transmit/Receive Unit (WTRU). The WTRU may comprise a transmitter, a receiver, and a processor, coupled to the transmitter and the receiver. The processor may be configured to monitor one or more control channels in multiple spectrum operating modes (SOMs) at operation 901. The processor may be configured to control the WTRU to operate in accordance with at least one power savings mode in at least one SOM at operation 902. A SOM (e.g., each SOM) may be associated with a control channel that carries information for allocating a set of spectrum blocks for the WTRU.

The processor may be further configured to perform different power savings modes at different times. A power saving mode may be determined based on timing references and relationships. The timing references and relationships may correspond to any of: a time-based triggering approach and a counting-based approach. The counting-based approach may manage time-related aspects of the power savings mode based on any of: TTI duration, shortest time between two scheduling opportunities, and other framing aspects.

The processor may be configured to control timing aspects of the power savings mode as a function of frame duration associated with a given SOM.

The processor may be configured to control timing aspects of the power savings mode as a function of scheduling opportunities or occasions associated with a given SOM.

The processor may be configured to perform power savings operation in at least one SOM and to apply a single power savings mode for a plurality of SOMs (e.g., all SOMs).

The processor monitoring one or more control channels in multiple SOMs may be configured to monitor a primary control channel associated with a specific SOM. The processor may be further configured to receive SOM configuration information on the monitored primary control channel. The SOM configuration information may include any of: resource blocks associated with a SOM (e.g., each SOM), a numerology, and/or duration of a numerology block.

The receiver may receive the SOM configuration information via radio resource control (RRC) signaling from a network. The receiver may further receive an indication of periods for monitoring one or more SOM-specific control channels on the primary control channel. The receiver may further receive an indication of a discontinuous reception period (DRX) associated with a specific SOM on the primary control channel. The primary control channel may include information indicating or disclosing any of: (1) a DRX time to be applied to a specific SOM, (2) an indication for continuous control channel monitoring, (3) an active time to be applied to a specific SOM, (4) a configuration/reconfiguration of DRX timers, and/or a control channel monitoring algorithm.

The processor may be configured to monitor the primary channel for a period of time. The processor may be configured to perform an independent DRX per SOM. The processor may be configured to monitor a SOM-specific control channel based on the independent DRX. The receiver may receive a change in DRX configuration of a first SOM from signaling received from a second SOM. The change in DRX configuration may include any of: (1) a change in a DRX cycle, (2) a change in any of DRX-related timer values, (3) a change in offset of the DRX cycle, (4) an indication to wake up, or (5) an indication to start monitoring a control channel at a predetermined time.

The processor monitoring the one or more control channels may be further configured to monitor the one or more control channels for a N number of scheduling opportunities on every M scheduling opportunities. The processor may be further configured to determine the values of M and N based on any of: (1) a configuration by a network, (2) preconfigured values, (3) a logical channel for which data arrival triggered a scheduling request (SR), (4) time-related requirements associated with arrival of new data that triggered an SR and/or (5) an SOM used to transmit an SR. The transmitter may be configured to transmit the SR.

FIG. 10 is a flow diagram illustrating another representative method for power saving. This representative method may be performed by any devices including a Wireless Transmit/Receive Unit (WTRU). The WTRU may comprise a transmitter, a receiver, and a processor, coupled to the transmitter and the receiver. The processor may be configured to determine a set of resources as a function of a processing state of the WTRU at operation 1001. The processor may be further configured to monitor one or more control channels using the determined set of resources. The processor may be further configured to decode at least one control channel element on the control channel at operation 1002. The processor may be configured to monitor the one or more control channels at a first timing granularity while in a first processing state. The processor may be configured to enable, on the control channel in the first processing state, at least one of: a first specific numerology, a specific set of scheduling occasions, or a HARQ timeline.

At operation 1003, the processor may be configured to determine that the WTRU is in a first processing state, decode downlink control information (DCI) in the first processing state on a set of control channel resources using at least one parameter, and determine to transition from the first processing state to a second processing state based on the decoding of the DCI. The set of control channel resources may include at least one of: a common search space, a common control channel, or a physical downlink control channel. The at least one parameter may be a function of at least one identifier used for processing control. The at least one parameter may indicate at least one of: an RNTI, a time symbol, a set of slots or mini-slots, a set of physical resource blocks, a set of resource element groups, or a set of control channel elements.

The processor may be further configured to determine configuration information on the WTRU such that the configuration information indicates at least one of: at least one identifier, at least one indexing value, or a radio network identifier (RNTI) to use for decoding one or more DCIs.

The processor may be further configured to determine, based on a successful decoding of the DCI, that the DCI includes at least one identifier. The processor may be further configured to determine that the at least one identifier included in the DCI matches at least one identifier indicated in configuration information on the WTRU. The determination to transition from the first processing state to the second processing state may be further based on the determination that the at least one identifier included in the DCI matches the at least one identifier indicated in configuration information on the WTRU.

The processor may be configured to decode the DCI for an identifier (e.g., each identifier) in the first processing state on the set of control channel resources using the associated at least one parameter. The first processing state may correspond to a lower processing level and the second processing state may correspond to a higher processing level. The first processing state and the second processing state may be associated with a number of decoding attempts of the DCI.

The processor may be configured to attempt to decode one or more DCIs based on a processing level associated with the transitioned processing state.

The receiver may be configured to receive, from the network, a signal including configuration information for the WTRU.

The processor may be configured to determine a pattern. The processor may be further configured to decode the at least one control channel element on the control channel based on the determined pattern. The processor may be further configured to decode the at least one control channel element on the control channel using a scheduling opportunity and/or occasion based on the determined pattern. The processor may be further configured to decode the at least one control channel element on the control channel using a different set of control channel resources, CCEs, and/or search spaces from the scheduling opportunity and/or occasion based on the determined pattern. The processor may be further configured to decode the at least one control channel element on the control channel using different aggregation levels from the scheduling opportunity and/or occasion based on the determined pattern. The processor may be further configured to decode the at least one control channel element on the control channel using different sets of one or more downlink control information (DCI) from the scheduling opportunity and/or occasion based on the determined pattern. The pattern may be associated with the processing state of the WTRU. The processor may be further configured to change to another pattern when changing to another processing state of the WTRU.

FIG. 11 is a flow diagram illustrating another representative method for power saving. This representative method may be performed by any devices including a network entity, a Node B, an evolved Node-B (eNode-B), etc. The evolved Node-B (eNode-B) may comprise a transmitter, a receiver, and a processor, coupled to the transmitter and the receiver. The processor may be configured to allocate a set of control channel resources to be used by a Wireless Transmit/Receive Unit (WTRU) for decoding at least one downlink control information (DCI) at operation 1101. The processor may be configured to allocate configuration information to the WTRU at operation 1102. The configuration information may indicate at least one identifier, each identifier being allocated to the WTRU and other WTRUs to align a processing state of the WTRU and the other WTRUs. The transmitter may be configured to transmit a signal indicating the set of control channel resources to the WTRU at operation 1103 and to transmit another signal including the configuration information to the WTRU at operation 1104. The configuration information may further indicate at least one of: at least one indexing value, or a radio network identifier (RNTI) to be used by the WTRU for decoding one or more DCIs. The set of control channel resources may include at least one of: a common search space, a common control channel, and/or a physical downlink control channel.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1-5.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A Wireless Transmit/Receive Unit (WTRU), comprising a transceiver and a processor which are configured to:
receive configuration information identifying groups of search spaces associated with a control resource set;
monitor, according to the configuration information, a first group of the search spaces for a first physical downlink control channel (PDCCH) transmission;
receive the first PDCCH transmission via the monitored first group of the search spaces, the first PDCCH transmission including downlink control information (DCI), the DCI including information indicating an index associated with a second group of the search spaces for monitoring by the WTRU for a second PDCCH transmission; and
monitor, the second group of the search spaces for the second PDCCH transmission, wherein the transceiver and the processor are configured to monitor only one of the first and second groups of the search spaces at a time.

2. The WTRU of claim 1, wherein the configuration information identifying the groups of the search spaces associated with the control resource set is included in a Radio Resource Control (RRC) message.

3. The WTRU of claim 1, wherein the transceiver and the processor are configured to monitor the first group of the search spaces for the first PDCCH transmission using any of: (1) the control resource set, or (2) a type of signaling structure.

4. The WTRU of claim 1, wherein the control resource set comprises any of: one or more control channel elements, one or more of the search spaces, and one or more aggregation levels.

5. The WTRU of claim 1, wherein the transceiver and the processor are configured to associate: (1) the monitoring of the first group of the search spaces with a first configuration for a data channel, and (2) the second group of the search spaces with a second configuration for the data channel, the second configuration being different than the first configuration.

6. The WTRU of claim 1, wherein the DCI includes information indicating a resource assignment associated with the second group of the search spaces, and
wherein the transceiver and the processor are configured to decode the second PDCCH transmission using the received resource assignment.

7. A method performed by a Wireless Transmit/Receive Unit (WTRU), the method comprising:
receiving configuration information identifying groups of search spaces associated with a control resource set;
monitoring, according to the configuration information, a first group of the search spaces for a first physical downlink control channel (PDCCH) transmission;
receiving the first PDCCH transmission via the monitored first group of the search spaces, the first PDCCH transmission including downlink control information (DCI), the DCI including information indicating an index associated with a second group of the search spaces for monitoring by the WTRU for a second PDCCH transmission; and
monitoring the second group of the search spaces for the second PDCCH transmission,
wherein the WTRU monitors only one of the first and second groups of the search spaces at a time.

8. The method of claim 7, wherein the configuration information identifying the groups of the search spaces associated with the control resource set is included in a Radio Resource Control (RRC) message.

9. The method of claim 7, wherein the monitoring of the first group of the search spaces for the first PDCCH transmission using any of: (1) the control resource set or (2) a type of signaling structure.

10. The method of claim 7, wherein the control resource set comprises any of: one or more control channel elements, one or more of the search spaces, or one or more aggregation levels.

11. The WTRU of claim 1, wherein the transceiver and the processor are configured to receive the second PDCCH transmission via the monitored second group of the search spaces.

12. The method of claim 7, further comprising:
receiving the second PDCCH transmission via the monitored second group of search spaces.

13. The method of claim 7, further comprising:
associating (1) the monitoring of the first group of the search spaces with a first configuration for a data channel, and (2) the second group of the search spaces with a second configuration for the data channel, the second configuration being different than the first configuration.

14. The method of claim 7, further comprising:
decoding the second PDCCH transmission using a resource assignment associated with the second group of the search spaces,
wherein the DCI includes information indicating the resource assignment.

15. The WTRU of claim 1, wherein the DCI includes information indicating at least one of:
a predefined time at which to transition to the monitoring of the second group of the search spaces,
configuration parameters defining any of a set of actions or behavior associated with the second group of the search spaces, and
a time difference between a time at which the DCI is received and a time at which to transition to the monitoring of the second group of the search spaces.

16. The WTRU of claim 1, wherein the transceiver and the processor are configured to switch to monitor the second group of the search spaces for the second PDCCH transmission based on a time at which the DCI is received.

17. The WTRU of claim 1, wherein the transceiver and the processor are configured to switch from monitoring the first group of search spaces to monitoring the second group of the search spaces for the second PDCCH transmission based on a predefined or statically defined time from when the DCI is received.

18. The method of claim 7, wherein the DCI includes information indicating at least one of:
a predefined time at which to transition to the monitoring of the second group of the search spaces,
configuration parameters defining any of a set of actions or behavior associated with the second group of the search spaces, and
a time difference between a time at which the DCI is received and a time at which to transition to the monitoring of the second group of the search spaces.

19. The method of claim 7, further comprising:
switching to monitoring the second group of the search spaces for the second PDCCH transmission based on a time at which the DCI is received.

20. The method of claim 7, further comprising:
switching from monitoring the first group of the search spaces to monitoring the second group of the search spaces for the second PDCCH transmission based on a predefined or statically defined time from when the DCI is received.

* * * * *